(12) United States Patent
Cattle et al.

(10) Patent No.: US 12,169,249 B2
(45) Date of Patent: Dec. 17, 2024

(54) RADAR SIGNAL MANAGEMENT USING TARGET CHARACTERISTICS

(71) Applicant: KMB Telematics, Inc., Washington, DC (US)

(72) Inventors: Bryan Cattle, Washington, DC (US); Marco La Manna, Washington, DC (US)

(73) Assignee: KMB TELEMATICS, INC., Washington, DC (US)

( * ) Notice: Subject to any disclaimer, the term of this patent is extended or adjusted under 35 U.S.C. 154(b) by 0 days.

(21) Appl. No.: 18/384,732

(22) Filed: Oct. 27, 2023

(65) Prior Publication Data

US 2024/0134005 A1 Apr. 25, 2024
US 2024/0230838 A9 Jul. 11, 2024

Related U.S. Application Data

(63) Continuation of application No. 17/164,330, filed on Feb. 1, 2021, now Pat. No. 11,835,647.

(Continued)

(51) Int. Cl.
*G01S 7/41* (2006.01)
*G01S 7/28* (2006.01)
(Continued)

(52) U.S. Cl.
CPC ............ *G01S 7/411* (2013.01); *G01S 7/2806* (2013.01); *G01S 7/282* (2013.01); *G01S 13/931* (2013.01);
(Continued)

(58) Field of Classification Search
CPC ........ G01S 7/411; G01S 7/2806; G01S 7/282; G01S 13/931; G01S 2013/93185; G01S 2013/9318; G01S 2013/9319
See application file for complete search history.

(56) References Cited

U.S. PATENT DOCUMENTS 4,642,641 A * 2/1987 Campbell ............... G01S 13/12
  342/88
5,227,801 A * 7/1993 Pierce ................... G01S 13/904
  342/90

(Continued)

FOREIGN PATENT DOCUMENTS

DE    102013021568 A1    6/2015

OTHER PUBLICATIONS

International Search Report and Written Opinion; PCT Application No. PCT/US2021/016063; Mailed May 11, 2021.

(Continued)

*Primary Examiner* — Peter M Bythrow
(74) *Attorney, Agent, or Firm* — NOVAK DRUCE CARROLL LLP

(57) ABSTRACT

Systems, methods, and computer-readable media for performing radar operations based on characteristics of a target. First operational limits defining a limit of a detection operation, imaging operation, or some combination thereof can be identified. The first operational limits can be associated with first operational values of operational parameters. Radar waveform parameters to optimize can be identified. Further, first optimal values for the radar waveform parameters can be identified based on the first operational values associated with the first operational limits. Additionally, a first optimized radar signal can be generated using the first optimal values of the radar waveform parameters. The first optimized radar signal can be optimized for the first operational limits. As follows, the first optimized radar signal can be transmitted towards a target area.

18 Claims, 10 Drawing Sheets

Related U.S. Application Data

(60) Provisional application No. 63/078,763, filed on Sep. 15, 2020, provisional application No. 62/969,654, filed on Feb. 3, 2020.

(51) Int. Cl.
    *G01S 7/282*     (2006.01)
    *G01S 13/931*     (2020.01)

(52) U.S. Cl.
    CPC .............. *G01S 2013/9318* (2020.01); *G01S 2013/93185* (2020.01); *G01S 2013/9319* (2020.01)

(56) References Cited

U.S. PATENT DOCUMENTS

| | | | | |
|---|---|---|---|---|
| 5,652,589 | A * | 7/1997 | Ono | G01S 13/345 342/79 |
| 5,694,130 | A * | 12/1997 | Suzuki | G01S 13/34 342/72 |
| 6,067,038 | A * | 5/2000 | Uehara | G01S 13/931 342/70 |
| 6,255,985 | B1 * | 7/2001 | Towner, III | G01S 7/295 342/162 |
| 6,861,974 | B1 * | 3/2005 | Poe | G01S 7/4008 342/134 |
| 7,791,528 | B2 * | 9/2010 | Klotzbuecher | G01S 13/584 342/132 |
| 8,059,026 | B1 * | 11/2011 | Nunez | G01S 13/0209 342/84 |
| 8,169,359 | B2 * | 5/2012 | Aoyagi | G01S 13/582 342/134 |
| 9,116,242 | B2 * | 8/2015 | Lee | G01S 13/931 |
| 10,473,755 | B1 * | 11/2019 | Doerry | G01S 13/90 |
| 10,775,478 | B2 * | 9/2020 | Davis | G01S 13/931 |
| 11,099,264 | B2 * | 8/2021 | Bhatia | G01S 13/12 |
| 11,099,267 | B2 * | 8/2021 | Wu | G01S 13/582 |
| 11,294,029 | B2 * | 4/2022 | Longman | G01S 7/35 |
| 2004/0164892 | A1 * | 8/2004 | Shinoda | H01Q 25/02 342/149 |
| 2006/0012513 | A1 * | 1/2006 | Walton | G01S 7/0235 342/135 |
| 2007/0152870 | A1 * | 7/2007 | Woodington | G01S 13/528 342/72 |
| 2010/0277359 | A1 * | 11/2010 | Ando | G01S 13/34 342/70 |
| 2011/0084871 | A1 * | 4/2011 | Haykin | G01S 7/4008 342/90 |
| 2011/0102244 | A1 * | 5/2011 | Jales | G01S 7/5273 342/134 |
| 2013/0222034 | A1 * | 8/2013 | Frei | H03K 3/02 327/299 |
| 2014/0097979 | A1 * | 4/2014 | Nohara | G01S 13/87 342/90 |
| 2016/0003938 | A1 * | 1/2016 | Gazit | G01S 13/02 342/81 |
| 2017/0153316 | A1 * | 6/2017 | Wintermantel | H03M 7/24 |
| 2017/0219689 | A1 * | 8/2017 | Hung | G01S 7/0232 |
| 2017/0254880 | A1 * | 9/2017 | Smith | G01S 13/87 |
| 2017/0307734 | A1 * | 10/2017 | Corretja | G01S 7/414 |
| 2018/0095161 | A1 * | 4/2018 | Kellum | G01S 13/10 |
| 2018/0284265 | A1 * | 10/2018 | Bilik | G01S 13/72 |
| 2019/0227143 | A1 * | 7/2019 | Lindenfeld | G01S 13/582 |
| 2019/0271776 | A1 * | 9/2019 | Davis | G01S 13/87 |
| 2019/0281260 | A1 * | 9/2019 | Ozbilgin | G01S 17/86 |
| 2020/0057137 | A1 * | 2/2020 | Solodky | G01S 7/354 |
| 2020/0150256 | A1 * | 5/2020 | Dent | G01S 7/282 |
| 2020/0333433 | A1 * | 10/2020 | Longman | G01S 7/35 |
| 2022/0171069 | A1 * | 6/2022 | Hamilton | G01S 13/931 |

OTHER PUBLICATIONS

English abstract of DE102013021568; retrieved from www.espacenet.com on Aug. 19, 2022.

Nijsure, Yogesh Anil et al., "Cognitive Chaotic UWB-MIMO Detect-Avoid Radar for Autonomous UAV Navigation", IEEE Transactions on Intelligent Transportation Systems (vol. 17, Issue: 11, Nov. 2016).

* cited by examiner

RADAR SIGNAL MANAGEMENT USING TARGET CHARACTERISTICS

CROSS-REFERENCE TO RELATED APPLICATIONS

This application is a Continuation Application to U.S. Non-Provisional application Ser. No. 17/164,330 filed Feb. 1, 2021, which claims the benefit of priority to U.S. Provisional Application No. 62/969,654 filed Feb. 3, 2020, claims the benefit of priority to U.S. Provisional Application No. 63/078,763 filed Sep. 15, 2020, the disclosures of which are herein incorporated by reference in their entirety.

TECHNICAL FIELD

The technical field relates to radar systems, and more particularly to managing signals from radar systems using characteristics of a target.

BACKGROUND

Advances in technology have allowed for increasingly accurate object sensing, imaging, and tracking within a field of view. In particular, advances in technology have allowed for increasingly accurate object imaging and object detection within a field of view. In turn, this has led to advances in numerous fields. Several fields include various vehicular fields (automotive, aeronautical (e.g., planes, spacecraft, manned and/or unmanned aerial vehicles (UAVs)), etc.). For example, improvements in object sensing and object detection have been integrated into vehicle drive control systems to facilitate autonomous and semi-autonomous vehicle control. In another example, improvements in sensing have led to advances in collision detection, thereby resulting in safer vehicles. In yet another example, improvements in sensing have helped hosts (e.g., detection systems on a fixed platform) sense objects, such as cars, planes, spacecraft, UAVs, etc.

Radar has been used for performing object sensing, imaging, and tracking. However, radar is typically used in object sensing, imaging, and tracking of an unknown target. More specifically, radar is typically used in performing operations with respect to a target agnostic as to the characteristics of the target. This presents many problems with respect to radar applications. Specifically, when the characteristics of the target are unknown, radar is typically applied through a waveform that is designed for all detectable targets regardless of specific characteristics of the targets. More specifically, the radar waveform is typically designed to measure one or a combination of targets at a maximum range of the radar, targets moving at the maximum velocity the radar can resolve, and targets with the smallest radar cross section the radar is designed to detect. In turn, this can limit the application of radar to a slower refresh rate and lower accuracy for various applications.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not, therefore, to be considered to be limiting of its scope, the principles herein are described and explained with additional specificity and detail through the use of the accompanying drawings in which.

DESCRIPTION OF EXAMPLE EMBODIMENTS

Figure 1:
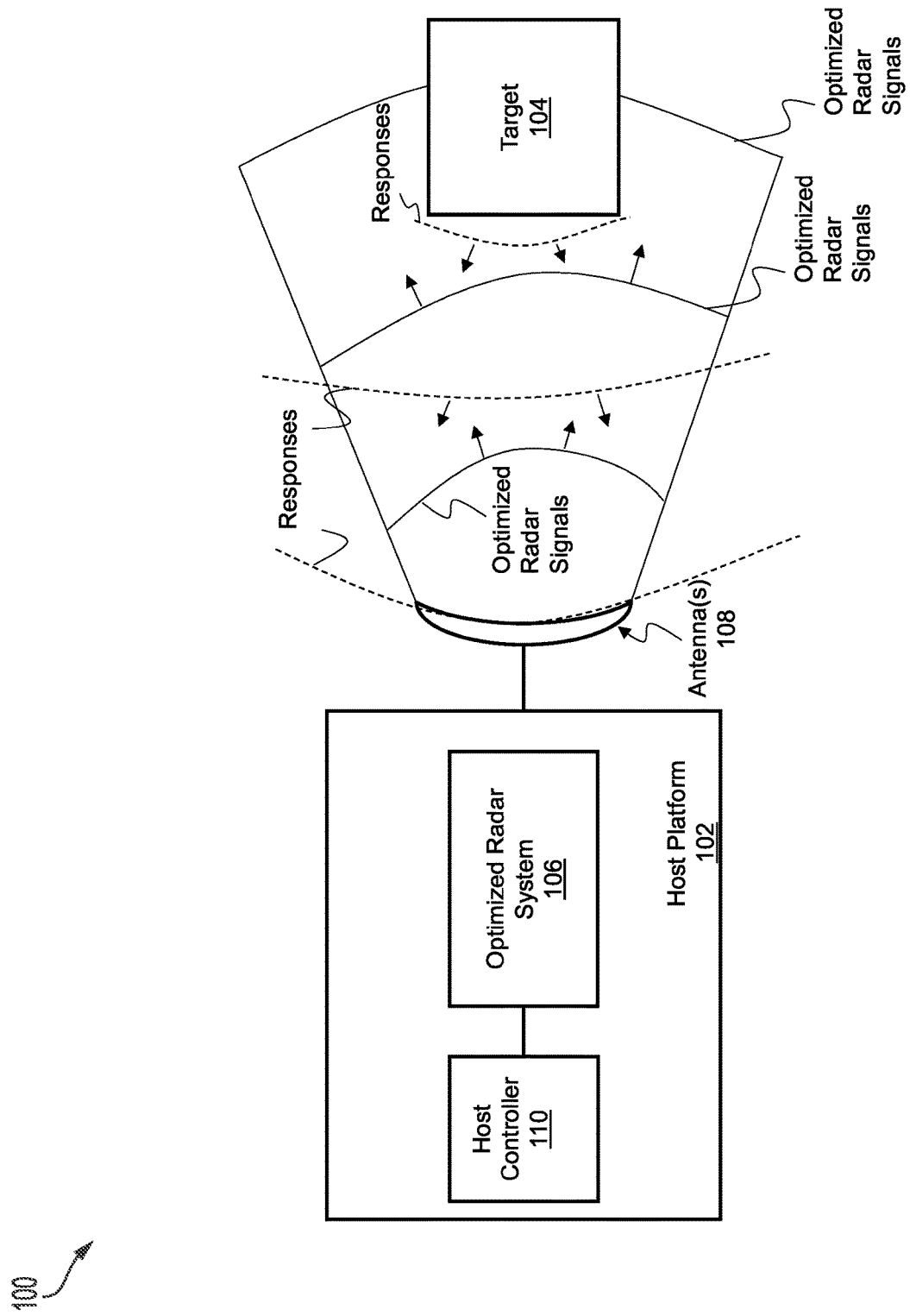
FIG. 1 illustrates an example environment for performing one or more operations through radar based on characteristics of a target, in accordance with some embodiments.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

Systems, methods, and computer-readable media for performing radar operations based on characteristics of a target.

In various embodiments, a radar system can comprise a signal generator. The signal generator can comprise a waveform optimization module that is operative to identify first operational limits defining a limit of a detection operation, imaging operation, or some combination thereof. The first operational limit can be associated with first operational values of operational parameters. The waveform optimization module can also be operative to identify radar waveform parameters to optimize. Further, the waveform optimization module can be operative to determine first optimal values for the radar waveform parameters based on the first operational values associated with the first operational limits. The signal generator can also comprise a modulation generation module. The modulation generation module can be operative to generate a first optimized radar signal using the first optimal values of the radar waveform parameters. The first optimized radar signal can be optimized for the first operational limits. The radar system can also comprise one or more antennas. The one or more antennas can be coupled to the signal generator and can be operative to transmit the first optimized radar signal toward a target in a target area.

In certain embodiments, a radar system can comprise a signal generator. The signal generator can comprise a waveform optimization module that is operative to identify a plurality of operational limits defining a plurality of limits of a detection operation, imaging operation, or some combination thereof. The operational limits can be associated with a plurality of operational values of operational parameters. The waveform optimization module can also be operative to identify radar waveform parameters to optimize. Further, the waveform optimization module can be operative to determine a plurality of optimal values for the radar waveform parameters based on the plurality of operational values associated with the plurality of operational limits. The signal generator can also comprise a modulation generation module. The modulation generation module can be operative to generate a plurality of optimized radar signals using the plurality of optimal values of the radar waveform parameters. The plurality of optimized radar signals can be optimized for each of the plurality of operational limits. The radar can also comprise one or more antennas. The one or more antennas can be coupled to the signal generator and can be operative to transmit the plurality of optimized radar signal toward a target in a target area.

In various embodiments, a method can include identifying first operational limits defining a limit of a detection operation, imaging operation, or some combination thereof. The first operational limits can be associated with first operational values of operational parameters. The method can also include identifying radar waveform parameters to optimize. Further, the method can include determining first optimal values for the radar waveform parameters based on the first operational values associated with the first operational limits. Additionally, the method can include generating a first optimized radar signal using the first optimal values of the radar waveform parameters. The first optimized radar signal can be optimized for the first operational limits. The method can also include transmitting the first optimized radar signal toward a target area.

In certain embodiments, a method can include identifying a plurality of operational limits defining a plurality of limits of a detection operation, imaging operation, or some combination thereof. The plurality of operational limits can be associated with a plurality of operational values of operational parameters. The method can also include identifying radar waveform parameters to optimize. Further, the method can include determining a plurality of optimal values for the radar waveform parameters based on the plurality of operational values associated with the plurality of operational limits. Additionally, the method can include generating a plurality of optimized radar signals using the plurality of optimal values of the radar waveform parameters. The plurality of radar signals can be optimized for each of the plurality of operational limits. The method can also include transmitting the plurality of optimized radar signals toward a target area.

In various embodiments, a radar system can comprise a signal generator. The signal generator can comprise a waveform optimization module. The waveform optimization module can be operative to identify one or more radar waveform parameters to optimize in transmitting one or more optimized radar signals toward a target in a target area. The waveform optimization module can also be operative to determine one or more optimal values for the one or more waveform parameters based on one or more characteristics of the target. The signal generate can also comprise a modulation generation module. The modulation generation module can be operative to generate one or more optimized radar signals using the one or more optimal values for the one or more radar waveform parameters. The radar system can also comprise one or more antennas coupled to the signal generator. The one or more antennas can be operative to transmit the one or more optimized radar signals toward the target in the target area.

In certain embodiments, a method can comprise identifying one or more radar waveform parameters to optimize in transmitting one or more optimized radar signals toward a target in a target area. The method can also include determine one or more optimal values for the one or more radar waveform parameters based on one or more characteristics of the target. Further, the method can include generating the one or more optimized radar signals using the one or more optimal values for the one or more radar waveform parameters. Additionally, the method can include transmitting the one or more optimized radar signals toward the target in the target area.

In various embodiments, a method of fabricating a drive control system can comprise configuring a signal generator for a radar system coupled to the drive control system to identify first operational limits defining a limit of a detection operation, imaging operation, or some combination thereof for the radar system of the drive control system. The first operational limits can be associated with first operational values of operational parameters. The method can also include configuring the signal generator to identify radar waveform parameters to optimize. Further, the method can include configuring the signal generator to determine first optimal values for the radar waveform parameters based on the first operational values associated with the first operational limits. Additionally, the method can include configuring the signal generator to generate a first optimized radar signal using the first optimal values of the radar waveform parameters. The first optimized radar signal can be optimized for the first operational limits. The method can also include configuring the drive control system to provide control instructions to drive a vehicle based on transmission of the first optimized radar signal toward one or more targets in a target area.

In certain embodiments, a method of fabricating a drive control system can comprise configuring a signal generator for a radar system coupled to the drive control system to identify a plurality of operational limits defining a plurality of limits of a detection operation, imaging operation, or some combination thereof for the radar system of the drive control system. The plurality of operational limits can be associated with a plurality of operational values of operational parameters. The method can also include configuring the signal generator to identify radar waveform parameters to optimize. Further, the method can include configuring the signal generator to determine a plurality of optimal values for the radar waveform parameters based on the plurality of operational values associated with the plurality of operational limits. Additionally, the method can include configuring the signal generator to generate a plurality of optimized radar signals using the plurality of optimal values of the radar waveform parameters. The plurality of optimized radar signals can be optimized for each of the plurality of operational limits. The method can also include configuring the drive control system to provide control instructions to drive a vehicle based on transmission of the plurality of optimized radar signal toward one or more targets in a target area.

Description

The disclosed technology addresses various technical needs, including one or more technical needs in the art for performing one or more operations through radar. The present technology involves systems, methods, and computer-readable media for performing one or more operations through radar based on characteristics of a target. These systems include hardware, software, and/or firmware, examples of which are disclosed at length herein.

As discussed previously, radar has been used for performing object sensing, imaging, and tracking. However, radar is typically used in object sensing, imaging, and tracking of an unknown target. More specifically, radar is typically used in performing operations with respect to a target agnostic as to characteristics of the target. This presents many problems with respect to radar applications. Specifically, when the characteristics of the target are unknown, radar is typically applied through a waveform that is designed for all detectable targets regardless of specific characteristics of the targets. More specifically, the radar waveform is typically designed to measure one or a combination of targets at a maximum range of the radar, targets moving at the maximum velocity the radar can resolve, and targets with the smallest radar cross section the radar is designed to detect. In turn, this can limit the application of radar to a slower refresh rate and lower accuracy. The present technology solves these and other deficiencies by performing one or more operations through radar based on one or more characteristics of a target. Further, the present technology solves these and other deficiencies by designing and manufacturing radar systems, and drive controllers implementing such radar systems, to perform operations based on characteristics of a target.

FIG. 1 illustrates an example environment 100 for performing one or more operations through radar based on characteristics of a target, in accordance with some embodiments. The environment 100 shown in FIG. 1 includes a host platform 102 and a target 104. In some embodiments, the host platform 102 can be a vehicle (e.g., an applicable machine for physical transportation). Specifically, the host platform 102 can be a land-based machine for performing physical transportation over land. Alternatively and as will be discussed in greater detail later, the host platform 102 can be an air-based machine for performing physical transportation through the air.

In some embodiments, the host platform 102 can be a fixed system or a system that is configured for bounded rotation or displacement with respect to one or more fixed points. For example, the host platform 102 can be a sensor system that operates to detect and/or monitor objects while the host platform 102 remains stationary or rotates about a fixed point. In another example, the host platform 102 can be a sensor system that operates to detect and/or monitor objects as the host platform 102 displaces within a bounded area or a bounded track with respect to one or more fixed points. The host platform 102 may, e.g., include a radar system that is fixed onto the ground or other stationary item. The host platform 102 may operate to detect and/or monitor vehicles (cars, UAVs, spacecraft, etc.). As noted herein, the host platform 102 may include a combination of a vehicle and a sensor system that operates to detect and/or monitor objects. As a non-limiting example of such a combination, the host platform 102 may comprise a sensor and/or detection system mounted onto a vehicle and operative to detect/monitor objects (stationary and/or non-stationary objects, other vehicles, etc.).

The target 104 can include an applicable physical object in the environment 100. More specifically, the target 104 can be an applicable object that is capable with interacting with electromagnetic energy, e.g. radio waves, in the environment 100.

In the example environment 100 shown in FIG. 1, the host platform 102 includes an optimized radar system 106 and one or more antennas 108. The optimized radar system 106 functions to generate radio waves that can be transmitted towards the target 104 as part of a radar operation. More specifically, the optimized radar system 106 can functions to generate radio waves based on characteristics of the target 104 that can be transmitted towards the target 104, e.g. through the one or more antennas 108, as part of a radar operation. As follows, the optimized radar system 106 can receive and/or otherwise process responses from the target 104 to the radio waves that are transmitted towards the target 104 as part of a radar operation. Such responses can be received through the one or more antennas 108.

"Radar," as used herein, can utilize electromagnetic energy within the radio spectrum to estimate properties of a channel, e.g. for detecting objects and identifying characteristics of objects. A "channel," as used herein, can begin at a transmitter, extend through one or more radio wave scatterers, and end at a receiver. Measured properties of a channel can include applicable properties of the channel, e.g. for object imaging, detection, and tracking. For example, measured properties of a channel can include propagation delay (the distance to a scatterer), Doppler frequency shift (the relative velocity of a scatterer), the attenuation of the signal within the channel, and/or the polarization transformation produced by a scatterer.

The host platform 102 also includes a host controller 110. The host controller 110 functions to control, at least in part, operation of the host platform 102. Specifically, the host controller 110 can control movement of the host platform 102. In being controlled, at least in part, by the host controller 110, the host platform 102 can be a semi-autonomous or fully autonomous vehicle that is capable of sensing its environment and moving safely with little and/or no human input. Examples of autonomous vehicles include autonomous cars, trucks, vans, airplanes (e.g., civilian and/or military drones), autonomous space vehicles, autonomous maritime craft, etc. In being controlled, at least in part, by the host controller 110, the host platform 102 can be a radar system that has physical components controlled and/or moved by the host controller 110. Examples of such radar systems include stationary, vehicle-mounted, and/or ground-based radar systems.

The host controller 110 can control driving of the host platform 102 based on one or more operations performed through radar by the optimized radar system 106. A radar operation, as used herein, includes an applicable function that is capable of being performed, at least in part, through radar. Examples of radar operations include an object imaging operation, an object sensing operation, an object detection operation, and an object tracking operation. For example, the host controller 110 can control driving of the host platform 102 based on the position of the target 104 relative to the host platform 102 tracked by the optimized radar system 106 through radar.

The optimized radar system 106 can perform one or more operations through radar based on one or more characteristics of the target 104. Specifically, the optimized radar system 106 can generate one or more optimized radar signals based on one or more characteristics of the target. Subsequently the one or more optimized radar signals can be transmitted towards the target 104 through the one or more antennas 108 as part of performing a radar operation. "Optimized" when discussed with respect to radar signals, as used herein, includes radar signals that are generated for a specific target based on one or more characteristics of the target as opposed to radar signals that are generated agnostic as to characteristics of a target.

Performing radar operations based on characteristics of a target is in contrast to radar operations that are performed through typical radar system. Specifically, typical radar system are configured to perform operations through radar irrespective of characteristics of a target, i.e. agnostic as to the characteristics of the target. As discussed previously, when the characteristics of the target are unknown, radar is typically applied through a waveform that is designed for all detectable targets regardless of specific characteristics of the targets. More specifically, the radar waveform is typically designed to measure one or a combination of targets at a maximum range of the radar, targets moving at the maximum velocity the radar can resolve, and targets with the smallest radar cross section the radar is designed to detect. As a result, the quality, accuracy, and/or sensitivity of an operation performed through a typical radar system is often compromised. The optimized radar system 106 overcomes these deficiencies by performing radar operations based on one or more characteristics of the target 104. Specifically, by performing a radar operation based on one or more characteristics of the target 104, the quality, accuracy, and/or sensitive of a radar operation performed by the optimized radar system 106 can be improved compared to when the radar operation is performed agnostic as to the characteristics of the target.

Figure 2:
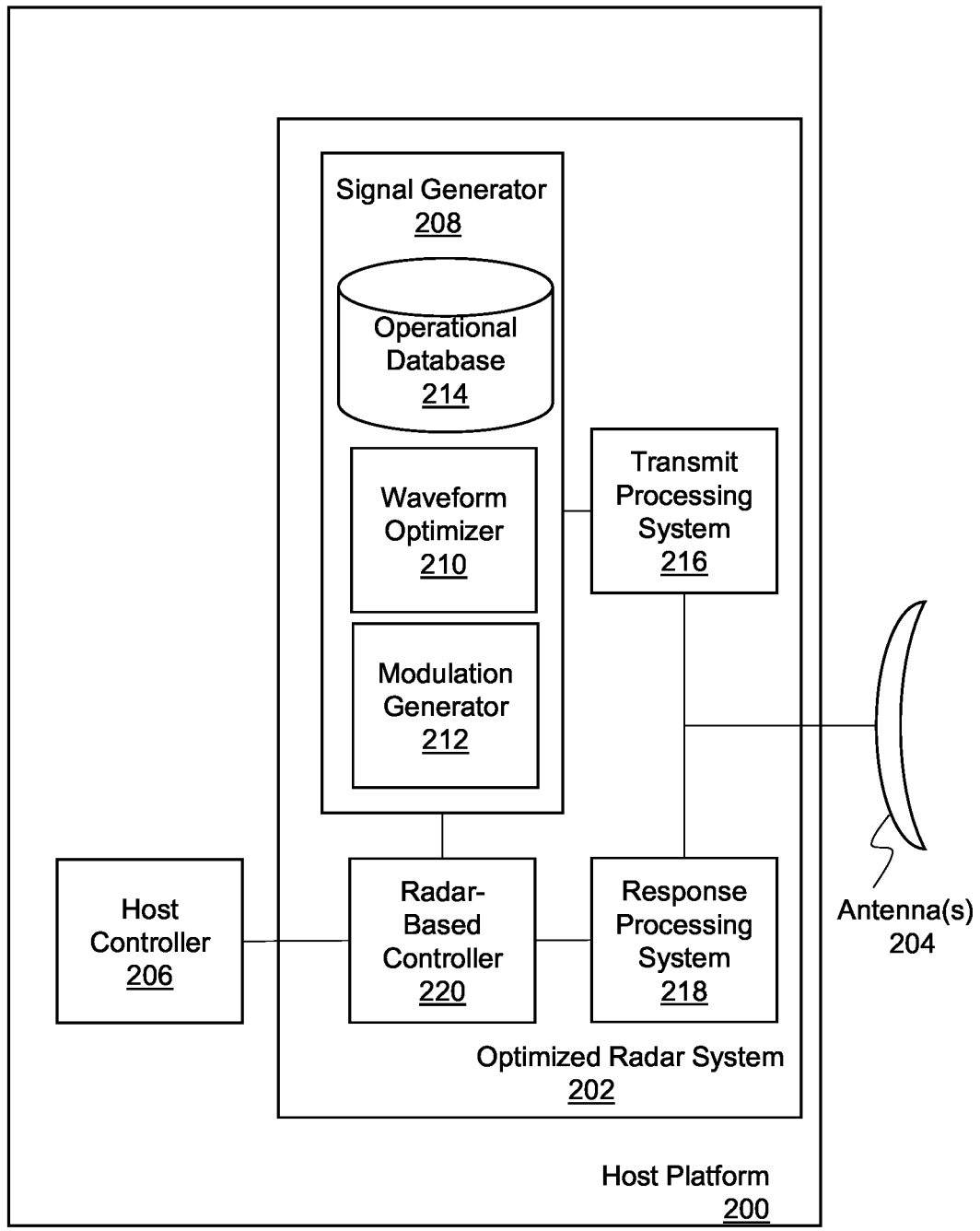
FIG. 2 illustrates an example host platform with an optimized radar system for performing operations through radar based on one or more characteristics of a target, in accordance with some embodiments.

FIG. 2 illustrates an example host platform 200 with an optimized radar system 202 for performing operations through radar based on one or more characteristics of a target, in accordance with some embodiments. The host platform 200 may function according to an applicable vehicle and/or stationary radar system, and can include components of the host platform 102 and/or can operate like the host platform 102 shown in FIG. 1. In some embodiments, the host platform 200 can be an autonomous or semi-autonomous vehicle.

The example host platform 200 shown in FIG. 2 includes an optimized radar system 202, one or more antennas 204, and a host controller 206. While the optimized radar system 202 is shown as being implemented with the host platform 200, the optimized radar system 202 can be implemented in an applicable application and at an applicable location for performing one or more radar operations. Specifically, the optimized radar system 202 can be implemented separate from a vehicle and/or stationary/mounted radar system and configured to perform radar operations in an application that is independent from controlling operation of a vehicle and/or stationary/mounted radar system.

The antennas 204 function according to one or more applicable antennas for transmitting and/or receiving radar signals, such as the one or more antennas 108 shown in FIG. 1. Specifically, the antennas 204 can function to transmit one or more optimized radar signals, e.g. optimized radar signals generated by the optimized radar system 202, based on one or more characteristics of a target. Further, the antennas 204 can function to receive one or more responses to optimized radar signals transmitted towards a target. For example, the antennas 204 can receive scattered responses to one or more optimized radar signals transmitted towards a target.

The host controller 206 functions according to an applicable controller for controlling, at least in part, operation of vehicle host platform, such as the host controller 110 shown in FIG. 1. Specifically and as will be discussed in greater detail later, the host controller 206 can control motion (driving, flying, etc.) of the host platform 200 based on radar signals transmitted towards a target associated with the host platform 200. More specifically and as will be discussed in greater detail later, the host controller 206 can control driving, flying, etc. of the host platform 200 based on optimized radar signals that are both generated based on characteristic(s) of a target associated with the host platform 200 and subsequently transmitted towards the target. In some implementations, the host controller 206 functions to control physical components of the host platform 200 to detect and/or monitor attributes of a target.

The optimized radar system 202 functions according to an applicable radar system for performing radar operations based on one or more characteristics of a target, such as the optimized radar system 106 shown in FIG. 1. Specifically, the optimized radar system 202 can generate one or more optimized radar signals for transmission towards a target based on one or more characteristics of the target. Further, the optimized radar system 202 can process one or more responses to radar signal(s) transmitted towards a target based on one or more characteristics of the target. More specifically, the optimized radar system 202 can process one or more responses to optimized radar signal(s) transmitted towards a target based on one or more characteristics of the target.

Characteristics of a target utilized by the optimized radar system 202 in performing one or more radar operations can include applicable physical properties associated with the target. Specifically, characteristics of a target for performing a radar operation can include a position of a target relative to the optimized radar system 202 and vice versa, a velocity of the target relative to the optimized radar system 202 and vice versa, and a range of the target relative to the optimized radar system 202 and vice versa. For example, a characteristic of a target can include a range of a target relative to a vehicle. Further, characteristics of a target for performing a radar operation can include a radar cross-section of the target, reflectivity of the target, and absorption properties of the target.

Characteristics of a target can be detected by the optimized radar system 202 itself. Specifically, characteristics of a target for performing radar operations can be detected by the optimized radar system 202 as the optimized radar system 202 operates in an active mode. An active mode, as used herein, includes a mode in which the optimized radar system 202 is actively operating to perform radar operations. More specifically, an active mode of operation can include a mode in which the optimized radar system 202 is operating to transmit and/or receive radar signals. The radar signals transmitted and received while the optimized radar system 202 operates in an active mode can be either or both optimized radar signals generated based on characteristic(s) of a target and radar signals generated agnostic as to the characteristic(s) of the target. For example, an active mode can include a mode in which the optimized radar system is actively imaging and/or actively detecting a target.

In detecting characteristics of a target while operating in an active mode, the optimized radar system 202 can transmit a reference, or otherwise pilot, radar signal towards a target, otherwise a target area. The pilot radar signal can have known characteristics and can be generated agnostic as to any known characteristics of the target. Subsequently, one or more responses to the pilot radar signal can be received at the optimized radar system 202, e.g. through the one or more antennas 204. Specifically, a representation of the pilot radar signal can be received from the target through one or more responses to the pilot radar signal. As follows, the optimized radar system 202 can compare the pilot radar signal to the representation of the pilot radar signal received from the target to identify one or more characteristics of the target. More specifically, the optimized radar system 202 can compare the known characteristics of the pilot radar signal to characteristics of the response(s) received from the target to identify one or more characteristics of the target.

Further, characteristics of a target can be identified external to operation of the optimized radar system 202, in what is also referred to as the characteristics being known a priori. Specifically, characteristics of a target can be identified external to the optimized radar system 202 operating in an active mode to perform one or more radar operations. For example, characteristics of a target can be identified before the optimized radar system 202 operates to perform one or more radar operations including at least one of detecting a target, imaging a target, and tracking a target. In another example, characteristics of a target can be identified contemporaneously with and separate from the optimized radar system 202 operating to perform one or more radar operations.

The optimized radar system 202 shown in FIG. 2 includes a signal generator 208, a transmit processing system 216 a response processing system 218, and a radar-based controller 220. The signal generator 208 functions to generate radar signals for transmission by the one or more antennas 204. Specifically, the signal generator 208 can generate optimized radar signals based on one or more characteristics of a target. Further, the signal generator 208 can generate radar signals agnostic as to one or more characteristics of a target. For example, the signal generator 208 can generate a pilot radar signal irrespective of one or more characteristics of a target.

The signal generator 208 includes a waveform optimizer 210, a modulation generator 212, and an operational database 214. The waveform optimizer 210 functions to identify one or more optimized radar signals to transmit based on one or more characteristics of a target. In identifying one or more optimized radar signals based on one or more characteristics of a target, the waveform optimizer 210 can identify one or more waveform parameters to optimize for generating the one or more optimized radar signals. As follows, the waveform optimizer 210 can determine one or more values of the one or more waveform parameters, as part of optimizing the one or more waveform parameters to generate the one or more optimized radar signals.

Waveform parameters, as used herein, include applicable parameters of a radar waveform that can be adjusted in either or both transmitting and receiving a radar signal. More specifically, waveform parameters can include applicable parameters of a radar waveform that can be adjusted based on one or more characteristics of a target in either or both transmitting and receiving one or more optimized radar signals. Waveform parameters can include a frequency of a radar signal, a phase of a radar signal, an amplitude of a radar signal, and characteristics of pulses of a radar signal, e.g. the number of pulses in the radar signal. Additionally, waveform parameters can include a type of modulation scheme for either or both modulating and demodulating a radar signal. For example, waveform parameters can include using Frequency-Modulated Continuous Wave ("FMCW") radar to modulate a radar signal, phase code modulation to modulate a radar signal, and Orthogonal frequency division multiplexing ("OFDM") to modulate a radar signal. Further, waveform parameters can include properties of a modulation scheme for either or both modulating and demodulating a radar signal. For example, waveform parameters can include a chirp duration associated with a modulation scheme, a frequency modulation ("FM") slope associated with a modulation scheme, a digital symbol rate associated with a modulation scheme, and a bandwidth associated with a modulation scheme.

The waveform optimizer 210 can identify one or more waveform parameters to optimize based on one or more characteristics of a target. For example, the waveform optimizer 210 can determine to modify one or a combination of a round-trip range parameter for a radar waveform, a digital sampling frequency parameter for a radar waveform, a pulse repetition time parameter for a radar waveform based on one or more characteristics of a target. Further, the waveform optimizer 210 can determine one or more values of one or more waveform parameters based on one or more characteristics of a target, as part of optimizing the one or more waveform parameters based on the one or more characteristics of the target. For example, the waveform optimizer 210 can identify values for one or a combination of a round-trip range parameter for a radar waveform, a digital sampling frequency parameter for a radar waveform, a pulse repetition time parameter for a radar waveform based on one or more characteristics of a target.

The waveform optimizer 210 can identify values for one or more waveform parameters, e.g. as part of optimizing the wave form parameters based on characteristic(s) of a target, based on operational limits associated with a radar system. Operational limits, as used herein, include limits of applicable operational parameters of the optimized radar system 202 in operating to perform one or more radar operations. More specifically, operational limits can include limits of the optimized radar system in performing one or a combination of a detection radar operation, a tracking radar operation, and an imaging radar operation.

In one example, an operational limit can include a maximum range of the optimized radar system 202 for one or a combination of a detection operation, a tracking operation, and an imaging operation. In another example, an operational limit can include a maximum unambiguous velocity of the optimized radar system 202 relative to a target for one or a combination of a detection operation, a tracking operation, and an imaging operation. In yet another example, an operational limit can include a minimum radar cross-section of the optimized radar system 202 for one or a combination of a detection operation, a tracking operation, and an imaging operation. In another example, an operational limit can include a minimum detectable intensity of the optimized radar system 202 for one or a combination of a detection operation, a tracking operation, and an imaging operation. In yet another example, an operational limit can include a minimum range resolution of the optimized radar system 202 for one or a combination of a detection operation, a tracking operation, and an imaging operation. In another example, an operational limit can include a maximum intensity of a reflection from a target or a target area that can be detected or imaged, e.g. reliably detected or imaged, by the optimized radar system 202 for one or a combination of a detection operation, a tracking operation, and an imaging operation.

In identifying values for one or more waveform parameters based on characteristics of a target, the waveform optimizer 210 can define operational values associated with operational limits of the optimized radar system 202. An operational value associated with an operational limit can include a value of an operational parameter that is the subject of the operational limit. Specifically, an operational value associated with an operational limit can include a value of an operational parameter that is less than or equal to the operational limit. More specifically, the waveform optimizer 210 can define an operational value associated with an operational limit of the optimized radar system 202 based on the operational limit of the optimized radar system 202. For example, if the maximum range of the optimized radar system 202 for performing a detection operation is 100 m, then the waveform optimizer 210 can define an operational value for the range limit of the radar system 202 as 90 m.

The waveform optimizer 210 can define operational values associated with operational limits of the optimized radar system 202 based on one or more characteristics of a target. In turn, the waveform optimizer 210 can identify one or more values for the radar waveform parameters, as part of generating an optimized radar signal, based on the defined operational values. Accordingly, the waveform optimizer 210 can identify the one or more values for the radar waveform parameters, e.g. as part of optimizing the radar waveform parameters to generate one or more optimized radar signals, based on the one or more characteristics of the target. Further, as the waveform optimizer 210 can define an operational value based on an operational limit and then optimize waveform parameters based on the operational value, the waveform optimizer can optimize a radar signal based on the operational limit.

In an example, the waveform optimizer 210 can identify operational values for operational limits of the optimized radar system 202 that include a maximum range value for the optimized radar system 202. Further, the waveform optimizer 210 can identify waveform parameters that include a round-trip range parameter. As follows, the waveform optimizer 210 can identify values for the waveform parameters by modifying the round-trip range parameter based on the maximum range value.

In another example, the waveform optimizer 210 can identify operational values for operational limits of the optimized radar system 202 that include either or both a radar pulse duration value and a radar pulse bandwidth value for the optimized radar system 202. Further, the waveform optimizer 210 can identify waveform parameters that include a round-trip range parameter. As follows, the waveform optimizer 210 can identify values for the waveform parameters by modifying the round-trip range parameter based on either or both the radar pulse duration value and the radar pulse bandwidth value.

In an example, the waveform optimizer 210 can identify operational values for operational limits of the optimized radar system 202 that include either or both a radar pulse duration value and a radar pulse bandwidth value for the optimized radar system 202. Further, the waveform optimizer 210 can identify waveform parameters that include a digital sampling frequency parameter. As follows, the waveform optimizer 210 can identify values for the waveform parameters by modifying the digital sampling frequency parameter based on either or both the radar pulse duration value and the radar pulse bandwidth value.

In another example, the waveform optimizer 210 can identify operational values for operational limits of the optimized radar system 202 that include a maximum unambiguous velocity value for the optimized radar system 202. Further, the waveform optimizer 210 can identify waveform parameters that include a pulse repetition time parameter. Pulse repetition time, as used herein, can include a width of one or more transmitted pulses. Pulse, as used herein, can refer to either or both the chirp and digital sequencing in a transmitted signal. As follows, the waveform optimizer 210 can identify values for the waveform parameters by modifying the pulse repetition time parameter based on the maximum unambiguous velocity value.

The waveform optimizer 210 can identify optimized values of one or more waveform parameters, e.g. as part of identifying one or more optimized radar signals, based on characteristics of a target that are either or both known a priori and detected by the optimized radar system 202 itself. For example, the signal generator 208 can be configured to generate a pilot radar signal. In turn, the waveform optimizer 210 can identify optimized values of one or more waveform parameters based on characteristics of a target identified, at least in part, by transmitting the pilot radar signal towards the target.

The operational database 214 functions to store operational data related to performing a radar operation by the optimized radar system 202. Operational data can include characteristics of one or more targets. In particular, operational data can include characteristics of one or more targets that are either or both known a priori and detected by the optimized radar system 202 itself while operating in an active mode. For example, operational data stored in the operational database 214 can include characteristics of a target that are input by a user external to the operation of the optimized radar system 202. In another example, operational data stored in the operational database 214 can include characteristics of a target that are discovered through a pilot radar signal.

Operational data stored in the operational database 214 can include operational data of past radar operations performed by the optimized radar system 202. For example, operational data stored in the operational database 214 can include values of waveform parameters that were used to generate optimized radar signals as part of a previously performed imaging operation. In another example, operational data stored in the operational database 214 can include characteristics of a target that were used in generating optimized radar signals in a past detection operation.

The waveform optimizer 210 can identify optimal values for radar waveform parameters, e.g. as part of optimizing radar signals based on characteristics of a target, based on operational data stored in the operational database 214. Specifically, the waveform optimizer 210 can determine optimal values for radar waveform parameters based on target characteristics included as part of operational data stored in the operational database 214. Further, the waveform optimizer 210 can determine optimal values for radar waveform parameters based on characteristics of previously optimized radar waveforms, as indicated by operational data stored in the operational database 214. More specifically, the waveform optimizer 210 can determine optimal values for waveform parameters based on previous optimized values for radar waveform parameters, as indicated by operational data stored in the operational database 214. For example, the waveform optimizer 210 can identify a reduced value for a round-trip range parameter with respect to a previous optimized value for the round-trip range parameter.

The modulation generator 212 functions to generate optimized radar signals for transmission by the one or more antennas 204. Specifically, the modulation generator 212 can generate optimized radar signals based on optimized values of radar waveform parameters identified by the waveform optimizer 210. More specifically, the modulation generator 212 can modulate radar signals to form optimized radar signals based on the optimized values of radar waveform parameters identified by the waveform optimizer 210.

The transmit processing system 216 functions to process radar signals generated by the signal generator 208 for transmission by the one or more antennas 204. Specifically, the transmit processing system 216 can process either or both optimized radar signals and pilot radar signals for transmission by the one or more antennas 204. The transmit processing system 216 can process radio signals for transmission as part of a radar operation, e.g. an imaging operation, a detection operation, and a tracking operation.

The response processing system 218 functions to process radar signals received by the one or more antennas 204. Specifically, the response processing system 218 can process responses to optimized radar signals that are received by the one or more antennas 204. Further, the response processing system 218 can process responses to pilot radar signals that are received by the one or more antennas 204. The response processing system 218 can process radio signals received as part of a radar operation, e.g. an imaging operation, a detection operation, and a tracking operation.

The radar-based controller 220 functions to control the optimized radar system 202. In controlling the optimized radar system 202 the radar-based controller 220 can control operation of the signal generator 208 in generating optimized radar signals based on characteristic(s) of a target. Further, the radar-based controller 220 can control operation of the signal generator 208 in generating pilot radar signals. Additionally, in controlling the optimized radar system 202, the radar-based controller 220 can control operation of the transmit processing system 216 to process radar signals for transmission. Further, in controlling the optimized radar system 202, the radar-based controller 220 can control operation of the response processing system 218 to process received responses to transmitted radar signals.

Further, the radar-based controller 220 can function to perform operations for controlling the host platform 200 based on a radar operation performed by the optimized radar system 202. Specifically, the radar-based controller 220 can perform operations for controlling a vehicle based on a radar operation performed by the optimized radar system based on characteristic(s) of a target. More specifically, the radar-based controller 220 can generate control instruction for controlling a vehicle based on one or more radar operations performed by the optimized radar system 202. For example, if a radar tracking operation performed by the optimized radar system 202 indicates that a target is out of line with the host platform 200, then the radar-based controller 220 can generate control instructions to drive the host platform 200 into alignment with the target. Specifically, the radar-based controller 220 can provide the control instructions to the host controller 206, which can actually implement the control instructions for controlling driving of the host platform 200 based on the control instructions. Separately or in combination, the radar-based controller 220 and the host controller 206 can function according to an applicable vehicle controller for controlling driving of a vehicle based on performed radar operations, such as the host controller 110 shown in FIG. 1.

Figure 3:
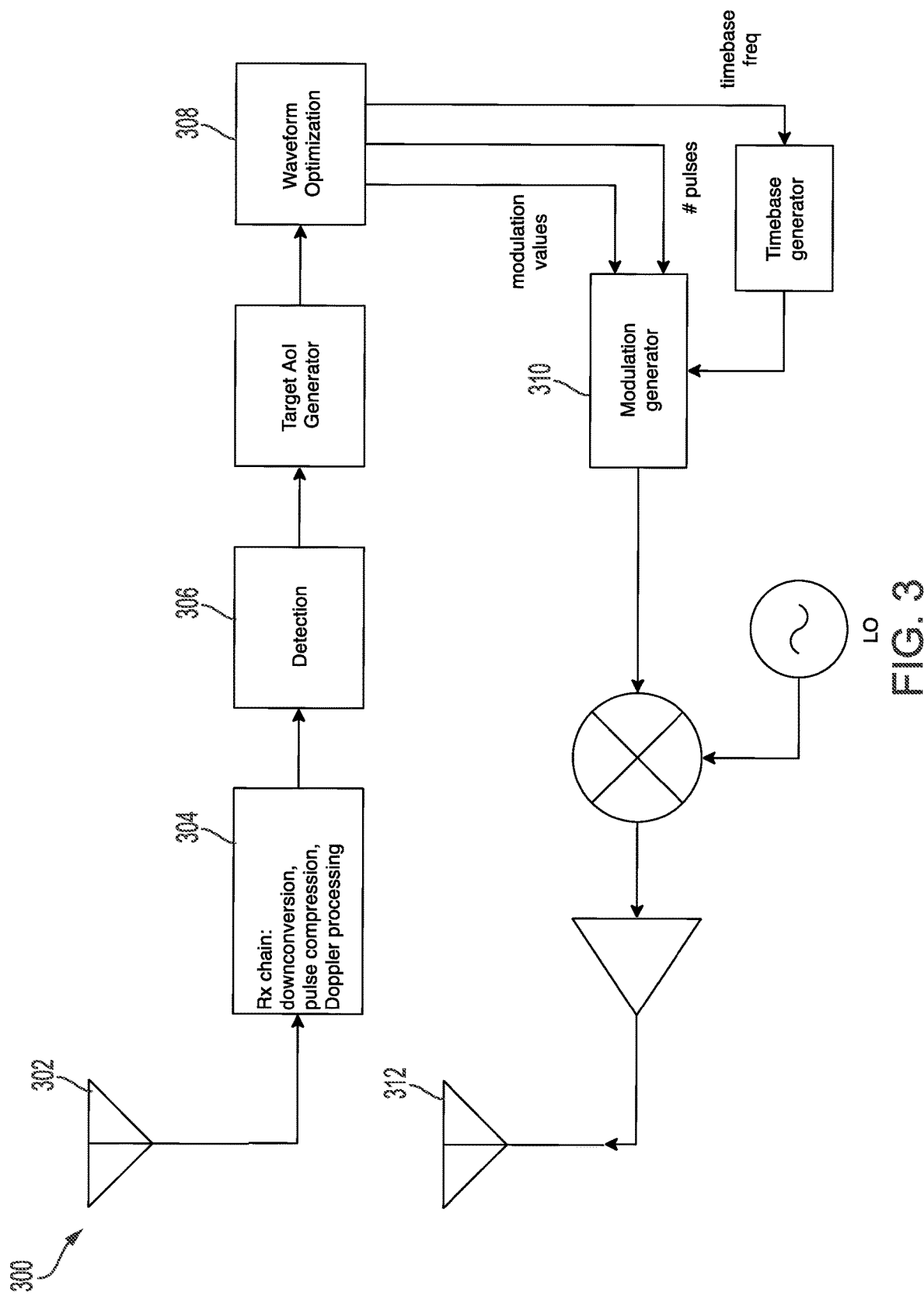
FIG. 3 shows a conceptual representation of a component flow for transmitting optimized radar signals based on received responses to transmitted radar signals, in accordance with some embodiments.

FIG. 3 shows a conceptual representation of a component flow 300 for transmitting optimized radar signals based on received responses to transmitted radar signals, in accordance with some embodiments. At step 302, responses to transmitted radar signals are received by one or more antennas. The received responses can be responses to one or more transmitted pilot radar signals. Further, the received responses can be responses to one or more transmitted optimized radar signals.

At step 304, various processing techniques are applied to the received responses. The processing techniques applied at step 304 can be applied by an applicable system for processing received radar responses, such as the response processing system 218 shown in FIG. 2. Examples of processing techniques applied at step 304 include a down-conversion processing technique, a pulse compression technique, and a Doppler processing technique.

At step 306, an area of interest is detected from the received responses. The area of interest can include a target area or an area within a target area. Specifically, the area of interest can include a detected object, e.g. serving as a target, in a target area. The area of interest can be detected from the received responses from an applicable system for processing received radar responses, such as the response processing system 218 shown in FIG. 2.

At step 308, a radar waveform is optimized based on the received responses to generate an optimized radar signal. The radar waveform can be optimized at step 308 based on one or more characteristics of the target area, e.g. as identified from the received responses. In optimizing the radar waveform to generate an optimized radar signal, one or more of values of a modulation scheme, a number of pulses, and a timebase frequency of the radar waveform can be optimized. The radar waveform can be optimized by an applicable system for optimizing radar waveform parameters based on one or more characteristics of a target area, such as the waveform optimizer 210 shown in FIG. 2.

At step 310, the optimized radar waveform is generated. Specifically, the optimized radar waveform can be generated by modulating a radar signal according to the optimized modulation values and the optimized number of pulses. Further, the optimized radar waveform can be generated based on the optimized timebase frequency. The optimized radar waveform can be generated by an applicable system for generating an optimized radar signal based on optimized values of radar waveform parameters, such as the modulation generator 212 shown in FIG. 2. The optimized timebase frequency can be generated through a separate system, such as the timebase generator shown in FIG. 3.

At step 312, the optimized waveform is transmitted towards the target area. The optimized waveform can be transmitted towards the target area as part of performing a radar operation, such as an imaging operation, a detection operation, or a tracking operation. As follows, responses to the transmitted optimized waveform can be processed to perform various operations, such as controlling driving of a vehicle.

Figure 4:
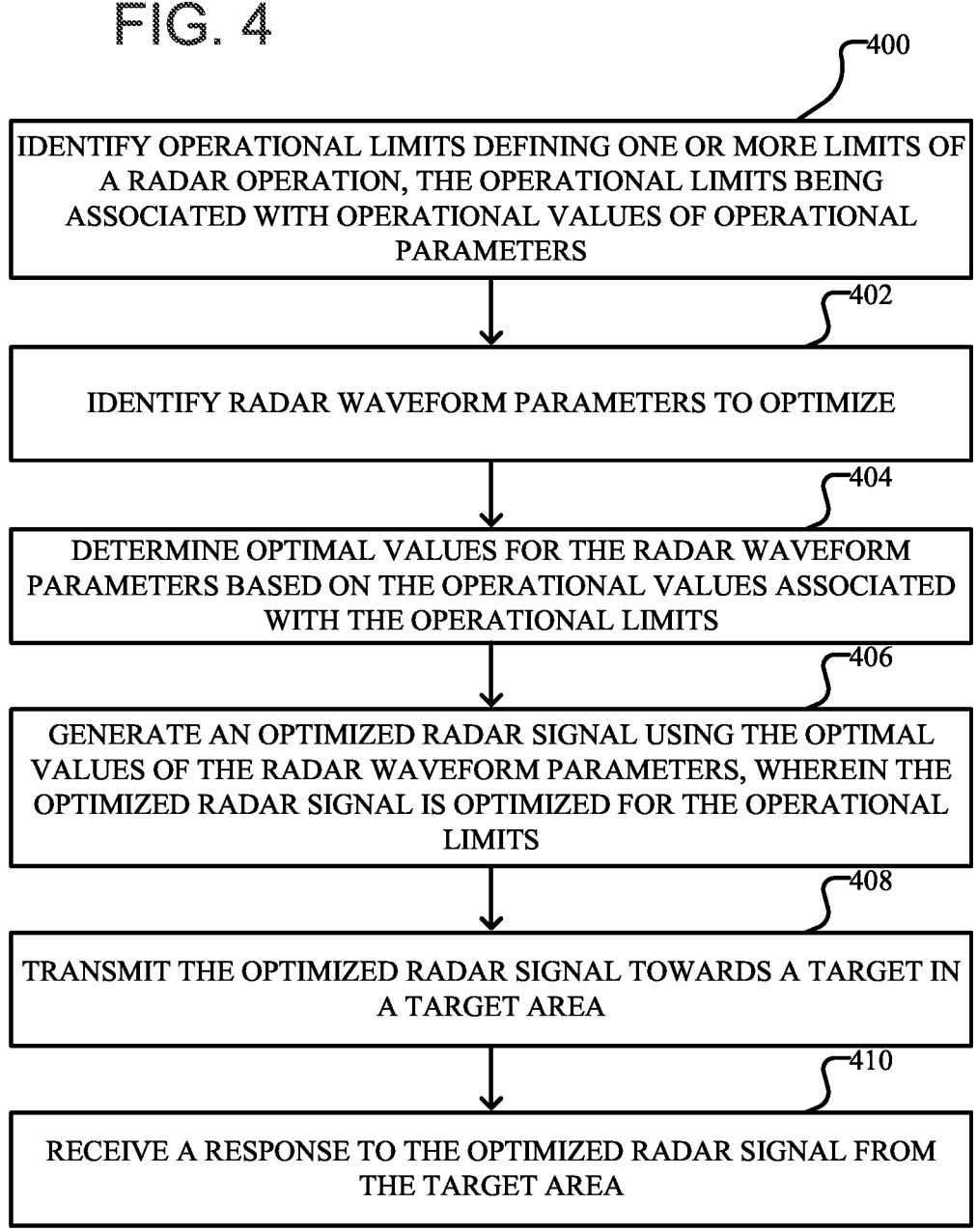
FIG. 4 illustrates a flowchart for an example method of performing a radar operation through an optimized radar signal, in accordance with some embodiments.

FIG. 4 illustrates a flowchart for an example method of performing a radar operation through an optimized radar signal, in accordance with some embodiments. The method shown in FIG. 4 is provided by way of example, as there are a variety of ways to carry out the method. Additionally, while the example method is illustrated with a particular order of steps, those of ordinary skill in the art will appreciate that FIG. 4 and the modules shown therein can be executed in any order and can include fewer or more modules than illustrated.

At step 400, operational limits defining a limit of a radar operation are identified. The radar operation can include a radar imaging operation, a radar detection operation, and a radar tracking operation. The operational limits can be associated with operational values of operational parameters. In particular, the operational limits can be associated with operational values of operational parameters of an applicable radar system, such as the optimized radar system 106 shown in FIG. 1 and the optimized radar system 202 shown in FIG. 2.

At step 402, radar waveform parameters to optimize are identified. Specifically, waveform parameters to optimize for one or more optimized radar signals in performing a radar operation can be identified. More specifically, waveform parameters to optimize for one or more optimized radar signals in either or both transmitting the optimized radar signals or receiving responses to the optimized radar signals can be identified.

Radar waveform parameters, as identified at step 402, can be either or both be identified and optimized based on one or more characteristics of a target. The FMCW radar waveform equation, Equation 1, shows that radar waveforms designed for a limiting design case are not optimal across an entire range of design cases. Specifically, the FMCW equation shows that radar waveform parameters can be identified and optimized based on one or more characteristics of a target for improved radar operation performance.

$$T = \frac{B \cdot R_{rt}}{f_s \cdot c} \qquad \text{Equation 1}$$

In Equation 1, T is the radar pulse (chirp) duration, B is the chirp bandwidth, $R_{rt}$ is the maximum round-trip range, $f_s$ is the digital sampling frequency, and c is the speed of light.

Specifically, a radar waveform designed for maximum range can have a longer pulse length than a radar waveform designed for shorter range. As follows, a radar system transmitting radar waveforms at the maximum range will have a slower refresh rate (frame rate). In turn, this can make it more difficult for the radar system to track a target. These results are particularly relevant to applications where the radar system is used in controlling driving of a vehicle. Specifically, if the radar system is used to guide a vehicle and hence operate a control law, such as a flight control law, high update speed is crucial for maintaining the stability of drive control.

Additionally, the signal-to-noise ratio ("SNR") equation, Equation 2, shows that radar waveform parameters can be identified and optimized for coherent radio systems.

$$SNR = N_c \frac{P_s}{P_n} \qquad \text{Equation 2}$$

In Equation 2, $N_c$ is the number of pulses (chirps) sent by a radar transmitter, $P_s$ is the transmitted signal power, and $P_n$ is the noise power, e.g. relative to radar receiver characteristics.

Specifically, a radar waveform designed to see a certain detectable target at maximum range can also involve sending more chirps to bring the SNR up to a detectable level, e.g. as compared to a radar waveform designed for a range that is less than a maximum range of a radar system when all other operational variables are considered equal. At close range, this $N_c$ can result in an SNR much higher than necessary for detection, which is undesirable. Lowering the $N_c$ as a function of range will still result in a detectable SNR while also allowing targets to be detected much faster.

Further, a longer pulse length can also translate into a smaller unambiguous Doppler frequency, which restricts the range of velocities that a radar system can resolve uniquely.

If the limiting design case is that the radar system should be able to measure the velocity of a target moving at a certain speed, then either the maximum range or the range resolution should be reduced. This is a fundamental tradeoff that limits the overall performance of the radar system.

Additionally, a radar system designed for maximum range will have a lower range resolution than a radar designed for a shorter range if all other operational variables are considered equal. However, it is more preferable for a radar system to have the maximum resolution available at a given target position. Therefore, waveform parameters can be optimized to ensure, at least in part, that the radar system has the maximum resolution available at an adequate range, e.g. with respect to a target, for performing one or more radar operations.

Returning back to the flowchart shown in FIG. 4, at step 404, optimal values for the radar waveform parameters are identified based on the operational values associated with the operational limits. The operational values associated with the operational limits can be identified based on one or more characteristics of a target/target area. As follows, in identifying optimal values for the radar waveform parameters based on the operational values associated with the operational limits, the optimal values for the radar waveform parameters can be identified based on the one or more characteristics of the target/target area.

At step 406, an optimized radar signal is generated using the optimal values of the radar waveform parameters. For example, an optimized radar signal can be generated by modulating or performing other radar signal processing techniques according to the optimal values of the radar waveform parameters. The operational values associated with the operational limits can be identified based on the operational limits themselves. In turn, as the optimized radar signal can be generated based, at least in part, on the operational values associated with the operational limits, the optimized radar signal can be optimized for the operational limits. For example, the operational limits can define a maximum range resolution of a radar system, and an actual range resolution achieved through an optimized radar signal can be defined with respect to the maximum range resolution, which is a function of the chirp bandwidth B shown in Equation 1, of the radar system.

At step 408, the optimized radar signal is transmitted towards a target in a target area. The optimized radar signal can be transmitted towards a target in a target area as part of an applicable radar operation, e.g. an imaging operation, a detection operation, and a tracking operation. Further, the optimized radar signal can be transmitted by one or more applicable antennas, such as the antennas described herein.

At step 410, a response to the optimized radar signal is received. The response to the optimized radar signal can be received as part of an applicable radar operation, e.g. an imaging operation, a detection operation, and a tracking operation. Further, the response to the optimized radar signal can be used in an applicable application for radar. More specifically, the response to the optimized radar signal can be used in controlling operation of a system associated with a host. For example, the response to the optimized radar signal can be processed as part of controlling driving of a vehicle. Specifically, control instructions for controlling a vehicle can be generated based on the response and provided for controlling the vehicle. For example, the response to the optimized radar signal can be processed as part of controlling driving of a vehicle. Further in the example, the vehicle can include a docking spacecraft, an unmanned aerial vehicle ("UAV"), an aerial vehicle, or an automobile. In another example, the response to the optimized radar signal can be processed as part of operation of a host, e.g. a stationary host or a host configured to displace or rotate with respect to one or more fixed points. More specifically, the response to the optimized radar signal can be processed as part of operation of a ground-based host configured to perform drone detection and/or control drone countermeasures.

Various steps of the example flowchart shown in FIG. 4 can be repeated, e.g. as part of an iterative process. Specifically, one or a combination of new operational limits, new radar waveform parameters, and new optimal values for radar waveform parameters can be identified as part of an iterative process. For example, the flowchart can proceed after step 410 with identifying new operational limits for a radar system and new optimal values for the waveform parameters can be identified based on the new operational limits. In another example, the flowchart can proceed after step 410 with identifying new radar waveform parameters to optimize and determining new optimal values for the new waveform parameters. Further, new optimized radar signals can be generated and transmitted based on one or a combination of the new operational limits, the new radar waveform parameters, and the new optimal values for radar waveform parameters. As follows, one or more responses to the new optimized radar signals can be received and used in performing one or more radar operations.

Figure 5:
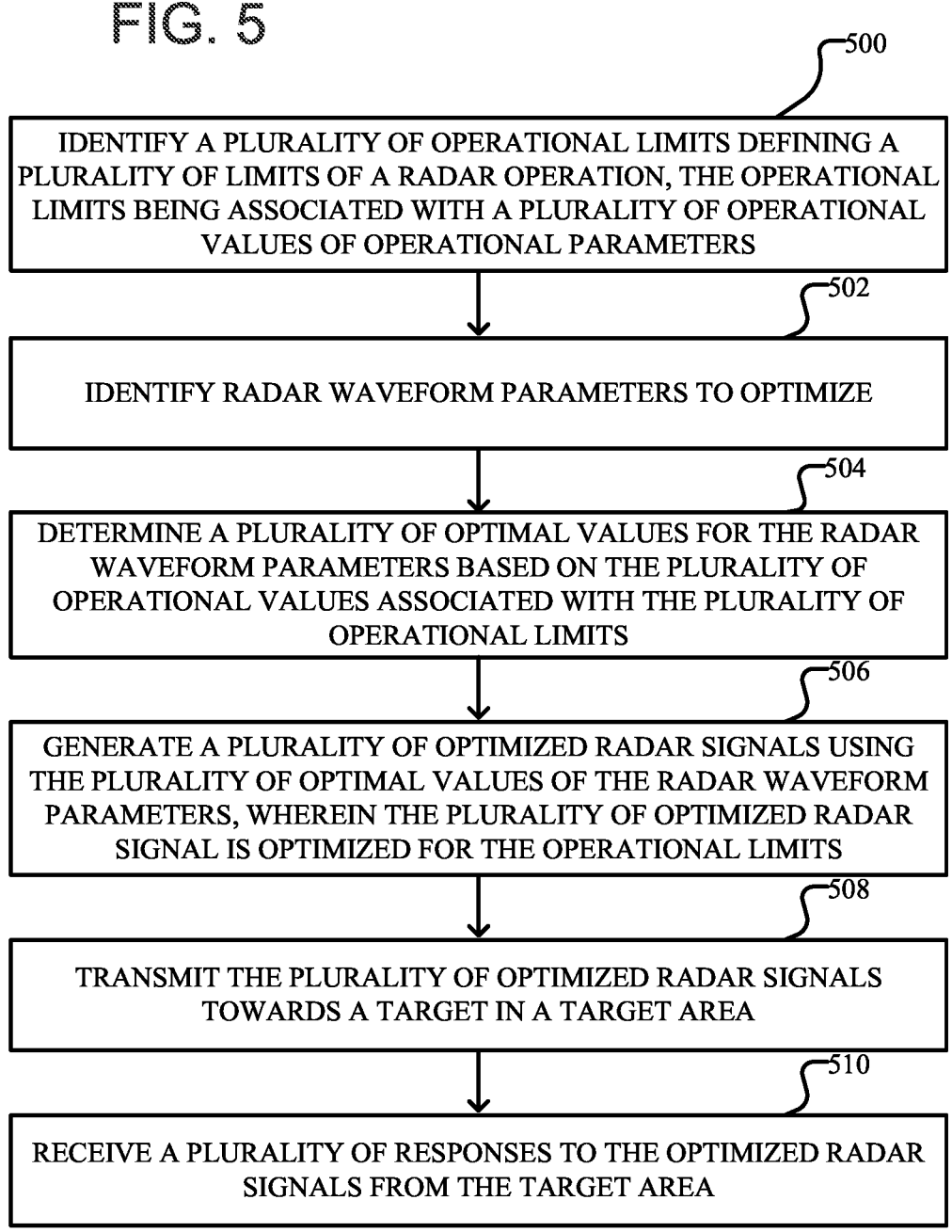
FIG. 5 illustrates a flowchart for an example method of performing a radar operation through a plurality of optimized radar signals, in accordance with some embodiments.

FIG. 5 illustrates a flowchart for an example method of performing a radar operation through a plurality of optimized radar signals, in accordance with some embodiments. The method shown in FIG. 5 is provided by way of example, as there are a variety of ways to carry out the method. Additionally, while the example method is illustrated with a particular order of steps, those of ordinary skill in the art will appreciate that FIG. 5 and the modules shown therein can be executed in any order and can include fewer or more modules than illustrated.

At step 500, a plurality of operational limits defining a plurality of limits of a radar operation are identified. The radar operation can include a radar imaging operation, a radar detection operation, and a radar tracking operation. The operational limits can be associated with operational values of operational parameters. In particular, the operational limits can be associated with operational values of operational parameters of an applicable radar system, such as the optimized radar system 106 shown in FIG. 1 and the optimized radar system 202 shown in FIG. 2.

At step 502, radar waveform parameters to optimize are identified. Specifically, waveform parameters to optimize in generating a plurality of radar signals in performing a radar operation can be identified. More specifically, waveform parameters to optimize for a plurality of optimized radar signals in either or both transmitting the plurality of optimized radar signals or receiving responses to the plurality of optimized radar signals can be identified.

At step 504, a plurality of optimal values for the radar waveform parameters are identified based on the plurality of operational values associated with the plurality of operational limits. The plurality of operational values associated with the plurality of operational limits can be identified based on one or more characteristics of a target/target area. As follows, in identifying a plurality of optimal values for the radar waveform parameters based on the plurality of operational values associated with the plurality of operational limits, the plurality of optimal values for the radar waveform parameters can be identified based on the one or more characteristics of the target/target area.

The operational parameters associated with the plurality of operational limits identified at step 500 can include one or more parameters associated with a signal-to-noise criterion for a performed radar operation. In turn, the radar waveform parameters identified at step 502 and optimized at step 504 can include a frame rate for a number of pulses for the signal-to-noise criterion. The signal-to-noise criterion can comprise a signal-to-noise-threshold representing a minimum radar cross-section or minimum detectable target for one or more optimized radar signals of a plurality of optimized radar signals generated based on the plurality of optimal values for the radar waveform parameters identified at step 504.

At step 506, a plurality of optimized radar signals are generated using the plurality of optimal values of the radar waveform parameters. For example, the plurality of optimized radar signals can be generated by modulating or performing other radar signal processing techniques according to the plurality of optimal values of the radar waveform parameters. Each of the plurality of operational values associated with the plurality of operational limits can be identified based on the plurality of operational limits themselves, e.g. on a separate basis with respect to the operational limits. In turn, as the optimized radar signals can be generated based, at least in part, on the operational values associated with the operational limits, the optimized radar signals can be optimized for the operational limits. For example, an operational limit of the plurality of operational limits can define a maximum range resolution of a radar system, and an actual range resolution achieved through the plurality of optimized radar signals can be defined with respect to the maximum range resolution of the radar system.

At step 508, the optimized radar signals are transmitted towards a target in a target area. The optimized radar signals can be transmitted towards a target in a target area as part of an applicable radar operation, e.g. an imaging operation, a detection operation, and a tracking operation. Further, the optimized radar signals can be transmitted by one or more applicable antennas, such as the antennas described herein.

At step 510, a plurality of responses to the optimized radar signals are received. The plurality of responses to the optimized radar signals can be received as part of an applicable radar operation, e.g. an imaging operation, a detection operation, and a tracking operation. Further, the responses to the optimized radar signals can be used in an applicable application for radar. Specifically, the responses to the optimized radar signal can be used in controlling operation of a system associated with a host. More specifically, control instructions for controlling a vehicle can be generated based on the responses and provided for actually controlling the vehicle. For example, the responses to the optimized radar signals can be processed as part of controlling driving of a vehicle. Further in the example, the vehicle can include a docking spacecraft, an unmanned aerial vehicle ("UAV"), an aerial vehicle, or an automobile. Further, control instructions for controlling operation of a host, e.g. a stationary host or a host configured to displace or rotate with respect to one or more fixed points, can be generated based on the responses and provided for actually controlling the host. For example, operations of a surveillance tower in detecting objects can be controlled based on the responses to the optimized radar signal.

Various steps of the example flowchart shown in FIG. 5 can be repeated, e.g. as part of an iterative process. Specifically, one or a combination of new operational limits, new radar waveform parameters, and new optimal values for radar waveform parameters can be identified as part of an iterative process. For example, the flowchart can proceed after step 510 with identifying new operational limits for a radar system and new optimal values for the waveform parameters can be identified based on the new operational limits. In another example, the flowchart can proceed after step 510 with identifying new radar waveform parameters to optimize and determining new optimal values for the new waveform parameters. Further, new optimized radar signals can be generated and transmitted based on one or a combination of the new operational limits, the new radar waveform parameters, and the new optimal values for radar waveform parameters. As follows, one or more responses to the new optimized radar signals can be received and used in performing one or more radar operations.

In performing the example flowcharts shown in either or both FIGS. 4 and 5 as part of an iterative process, frame rates of a radar system can be optimized as part of controlling a vehicle. Specifically, a frame rate of a radar system can be optimized as part of a vehicle moving closer and closer to a target. As follows, a rate at which control instructions for controlling the vehicle are provided based on operation of the radar system can be optimized. For example, as a vehicle approaches a target, a radar frame rate of a radar system coupled to the vehicle can be increased as the radar system performs a radar operation. Further in the example, control instructions for controlling driving of the vehicle that are generated based on the radar operation can be provided at a faster rate as the vehicle approaches the target. In the example, the radar operation can be performed for controlling driving of the vehicle to physically contact the target. Still further in the example, the radar system can generate at a faster rate control instructions for controlling driving of the vehicle as the vehicle approaches the target. In turn, this can lead to more accurate control of the vehicle for directing the vehicle towards the target.

Figure 6:
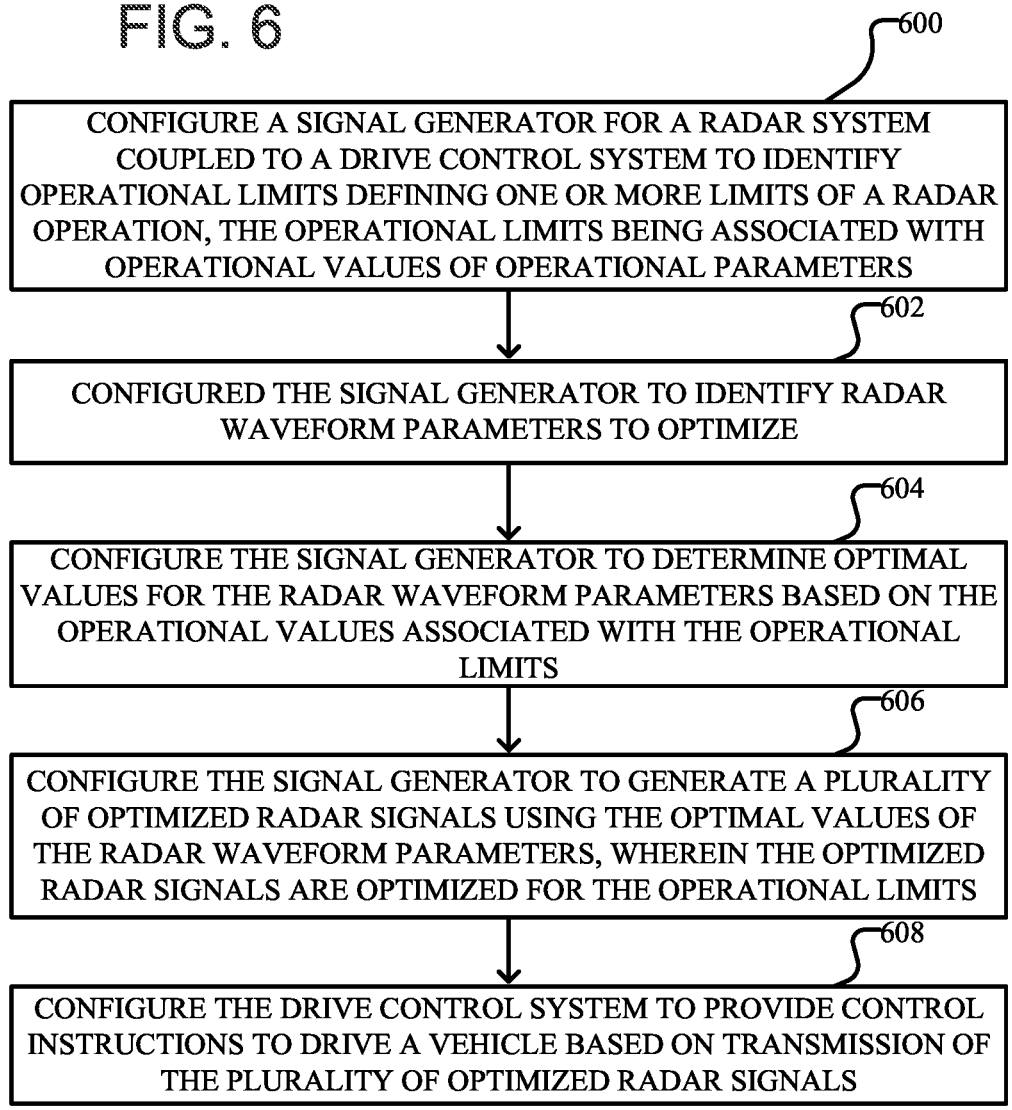
FIG. 6 illustrates a flowchart for an example method of fabricating a drive control system of a vehicle to control a vehicle based on radar operation(s) performed using optimized radar signals, in accordance with some embodiments.

FIG. 6 illustrates a flowchart for an example method of fabricating a drive control system of a vehicle to control a vehicle based on radar operation(s) performed using optimized radar signals, in accordance with some embodiments. The method shown in FIG. 6 is provided by way of example, as there are a variety of ways to carry out the method. Additionally, while the example method is illustrated with a particular order of steps, those of ordinary skill in the art will appreciate that FIG. 6 and the modules shown therein can be executed in any order and can include fewer or more modules than illustrated.

At step 600, a signal generator for a radar system is configured to identify operational limits defining one or more limits of a radar operation. The radar system is coupled to a drive control system. Operating in combination, the radar system and the drive control system are configured to generate control instructions for driving a vehicle based on optimized radar signals generated by the signal generator.

At step 602, the signal generator is configured to identify radar waveform parameters to optimize. The signal generator, e.g. as part of fabricating the drive control system, can be configured to identify radar waveform parameters to optimize based on one or more characteristics of a target in a target area. The one or more characteristics of the target can be identified a priori or through the transmission of one or more pilot radar signals.

At step 604, the signal generator is configured to determine a plurality of optimal values for the radar waveform parameters based on the operational values associated with the operational limits. The signal generator, e.g. as part of fabricating the drive control system, can be configured to identify the operational values based on the one or more characteristics of the target. Accordingly, the signal generator, e.g. as part of fabricating the drive control system, can be configured to determine optimal values for the radar waveform parameters based on the one or more characteristics of the target.

At step 606, the signal generator is configured to generate a plurality of optimized radar signals using the plurality of optimal values for the radar waveform parameters. More specifically, the signal generator can be configured to generate a plurality of optimized radar signals using the plurality of optimal values for the radar waveform parameters that are determined based on the operational values associated with the operational limits. The operational values can comprise a plurality of distances to the target area and the plurality of optimal values for the waveform parameters can comprise a plurality of frame rates. Specifically, the signal generator can be configured to increase the frame rates as the distance to the target area decreases over time. As follows, the signal generator can generate the plurality of optimized radar signals at an increasing rate as the distance to the target area decreases over time.

At step 608, the drive control system is configured to provide control instructions to drive a vehicle based on transmission of the plurality of optimized radar signals towards one or more targets in a target area. Specifically, the drive control system can be configured to generate and provide control instructions based on the plurality of optimized radar signals transmitted towards a target area and the responses to the plurality of optimized radar signals received from the target area. The drive control system can be configured to provide the control instructions at a rate based on operational values associated with the operational limits. More specifically, the drive control system can be configured to provide the control instructions at a rate based on a frame rate at which the signal generator generates the optimized radar signals. For example, the drive control system can be configured to provide the control instructions at an increasing rate as the distance to the target area decreases over time. This can ensure that the vehicle is accurately driven towards the target area as the distance between the vehicle and the target area decreases.

Figure 7:
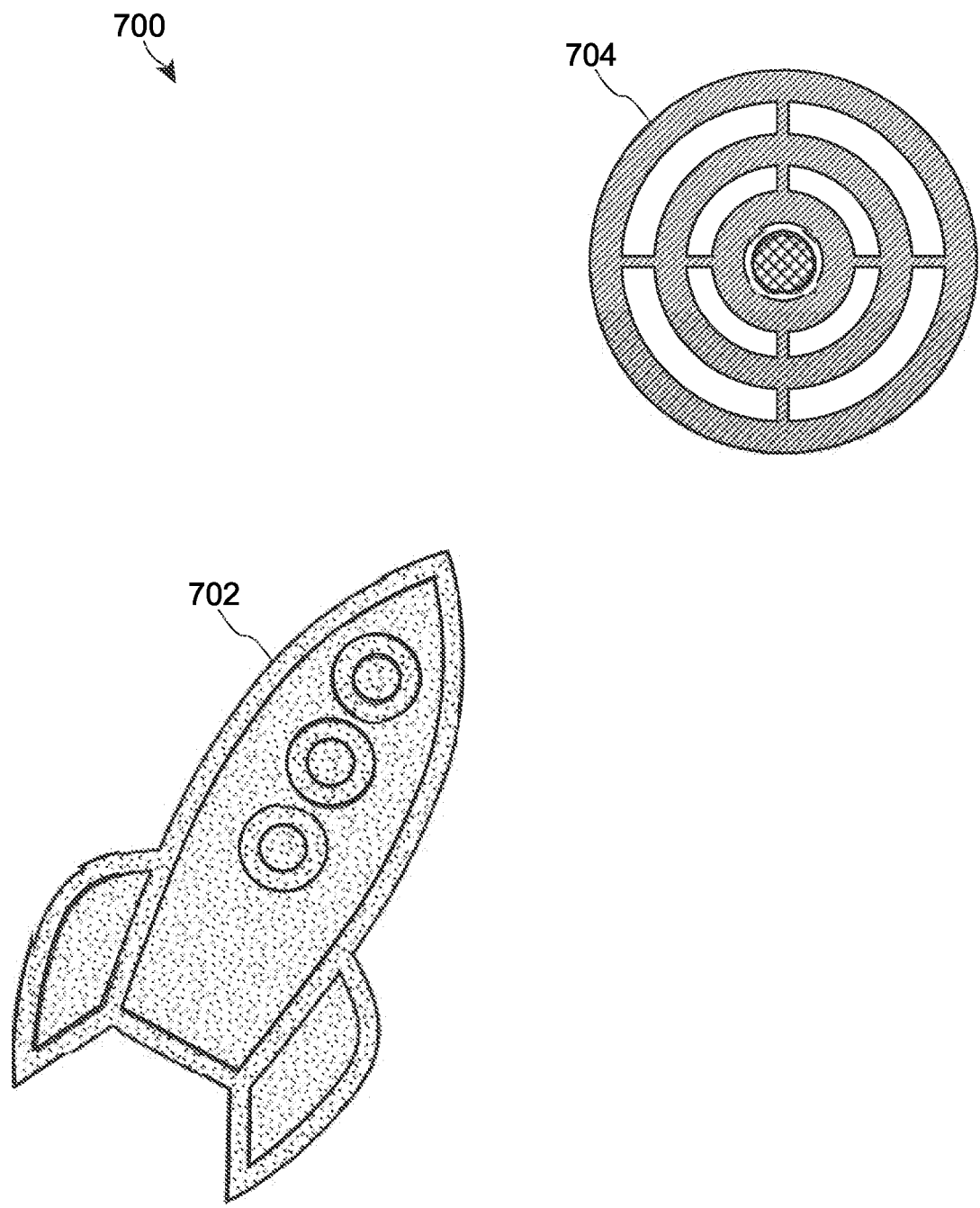
FIG. 7 shows an environment of a docking spacecraft configured to dock according to one or more radar operations performing based on optimized radar signal, in accordance with some embodiments.

The systems and techniques described herein for performing radar operations based on optimized radar signals are ideal for controlling a vehicle approaching a target, e.g. a docking spacecraft, flying machine coming down to a landing pad, aircraft aerial refueling, or a drone trying to hit another drone. FIG. 7 shows an environment 700 of a docking spacecraft configured to dock according to one or more radar operations performing based on optimized radar signal, in accordance with some embodiments. The environment 700 shown in FIG. 7 includes a spacecraft 702 and a target 704. The spacecraft 702 is configured to dock at the target 704. As part of controlling docking at the target 704, driving of the spacecraft 702 can be controlled through the systems and techniques for performing radar operations through optimized radar signals described herein.

The systems and techniques described herein are ideal for controlling a vehicle approaching a target, such as in the environment 700 shown in FIG. 7 because as the range to the target decreases, it becomes increasingly important to know the target's exact position. In some cases, a control system can be used to guide a platform containing a radar system, for example a flight control system being used to steer an aircraft. Control systems rely on being able to run at a fast-enough update rate to maintain stability. If the update rate slows enough, the control system may become unstable, and for example crash the aircraft. However, increasing the update rate as the vehicle approaches the target, e.g. by increasing the frame rate of the radar system, can ensure that the control system remains stable.

These benefits are further realized when both a vehicle and a target are moving, e.g. in a mid-air aircraft refueling scenario. Specifically, if one vehicle is approaching another, then as the distance between them shrinks the relative size of the other vehicle grows. This means that the control authority needed to affect a change to maintain position relative to the other vehicle also grows. This places additional stress on the flight controller, as the need to exert additional control authority increases the likelihood of the control system going unstable. Increasing the radar's update rate can solve this issue.

Figure 8:
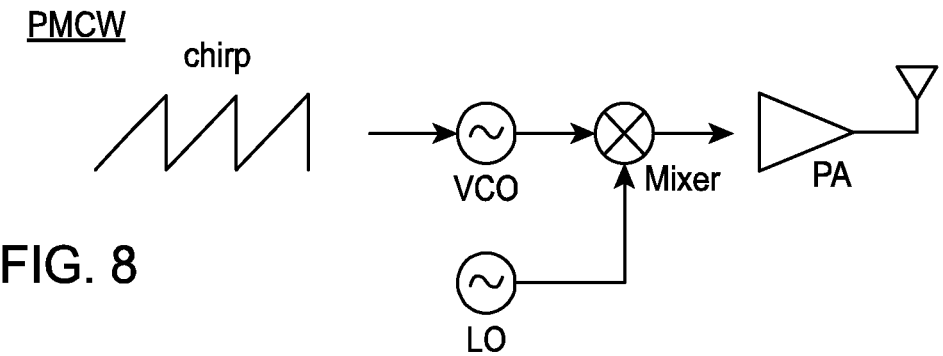
FIG. 8 shows a component diagram of an optimized radar system for generating an optimized radar signal using FMCW radar, in accordance with some embodiments.
Figure 9:
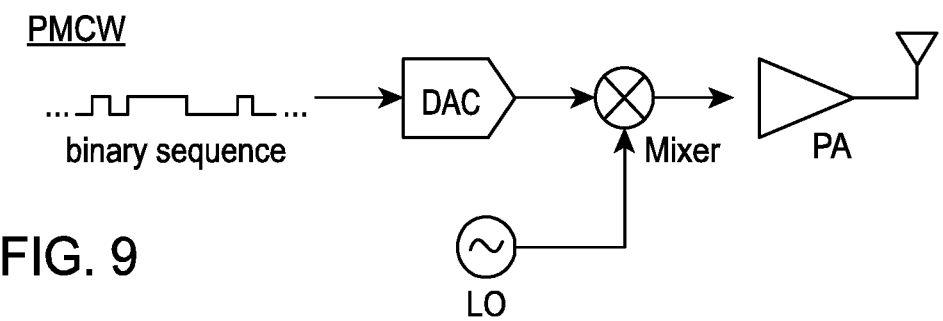
FIG. 9 shows a component diagram of an optimized radar system for generating an optimized radar signal using Phase-Modulated Continuous Wave ("PMCW") radar, in accordance with some embodiments.
Figure 10:
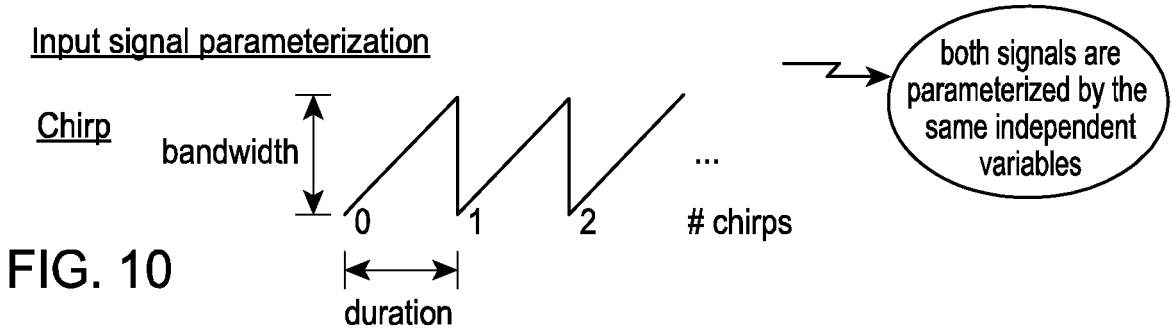
FIG. 10 shows an input signal for parameterization through FMCW radar, in accordance with some embodiments.
Figure 11:
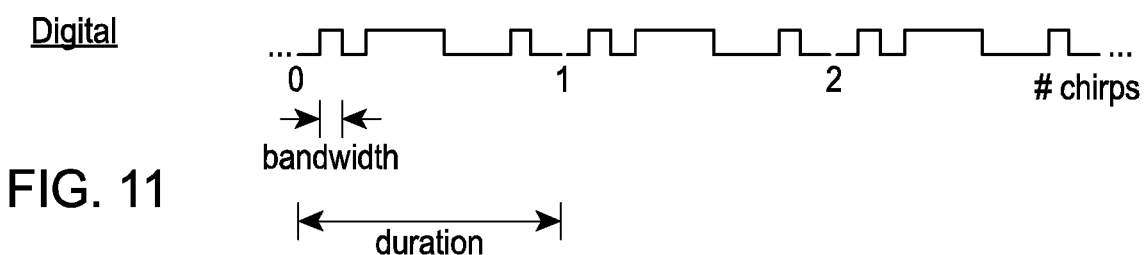
FIG. 11 shows an input signal for parameterization through PMCW radar, in accordance with some embodiments.

FIG. 8 shows a component diagram of an optimized radar system for generating an optimized radar signal using FMCW radar, in accordance with some embodiments. FIG. 9 shows a component diagram of an optimized radar system for generating an optimized radar signal using Phase-Modulated Continuous Wave ("PMCW") radar, in accordance with some embodiments. FIG. 10 shows an input signal for parameterization through FMCW radar, in accordance with some embodiments. FIG. 11 shows an input signal for parameterization through PMCW radar, in accordance with some embodiments.

Figure 12:
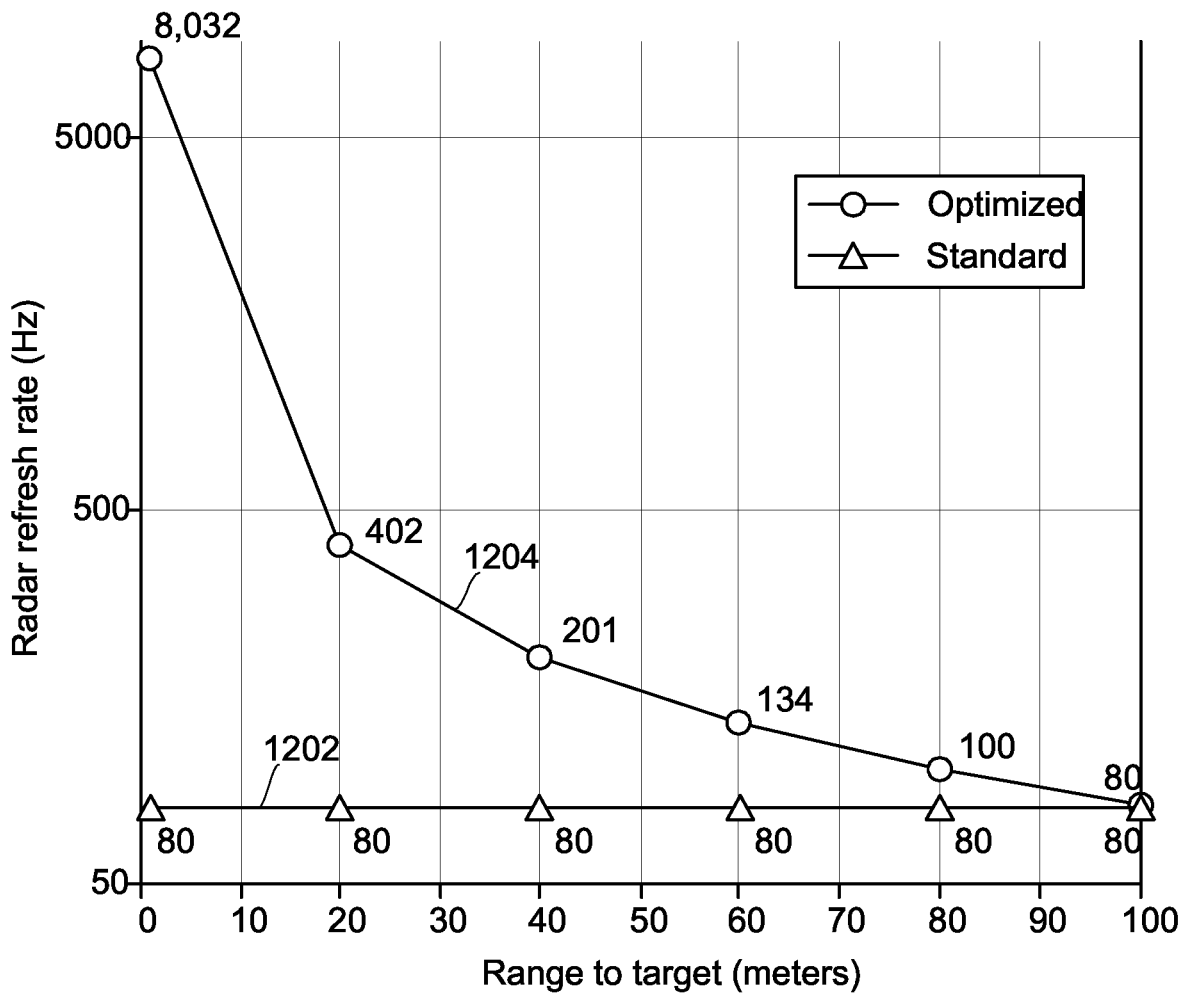
FIG. 12 is a plot of radar refresh rate versus target range, in accordance with some embodiments.

The disclosure now turns to a further discussion of optimizing radar waveform parameters based on target range. FIG. 12 is a plot of radar refresh rate versus target range, in accordance with some embodiments. In current radars, the refresh rate is not optimized as a function of target range. Specifically, line 1202 shows the refresh rate remaining constant across the entire range to target, as measured in meters. More specifically, the refresh rate for this particular radar scenario is 80 frames per second, regardless of the range to the target. By using Equation 1, the radar waveform can be optimized based on the last-detected range of the target. Line 1204 shows, the results of this optimization. Specifically, when the target is 100 meters from the radar, the refresh rate is the same for both waveforms: 80 frames per second. However, as the target range gets closer, the radar waveform is re-calculated dynamically using equation (1). This produces a smaller T, resulting in shorter-duration pulses which can be recorded faster. FIG. 12 shows the corresponding increase in frame rate. As the range to target decreases, the frame rate increases exponentially. This represents a large increase in performance over the current waveform design method. Moreover, Equation 2 can also be used to provide a specific number of chirps (and thus a SNR) that does not vastly exceed the threshold needed for subsequent signal processing.

Figure 13:
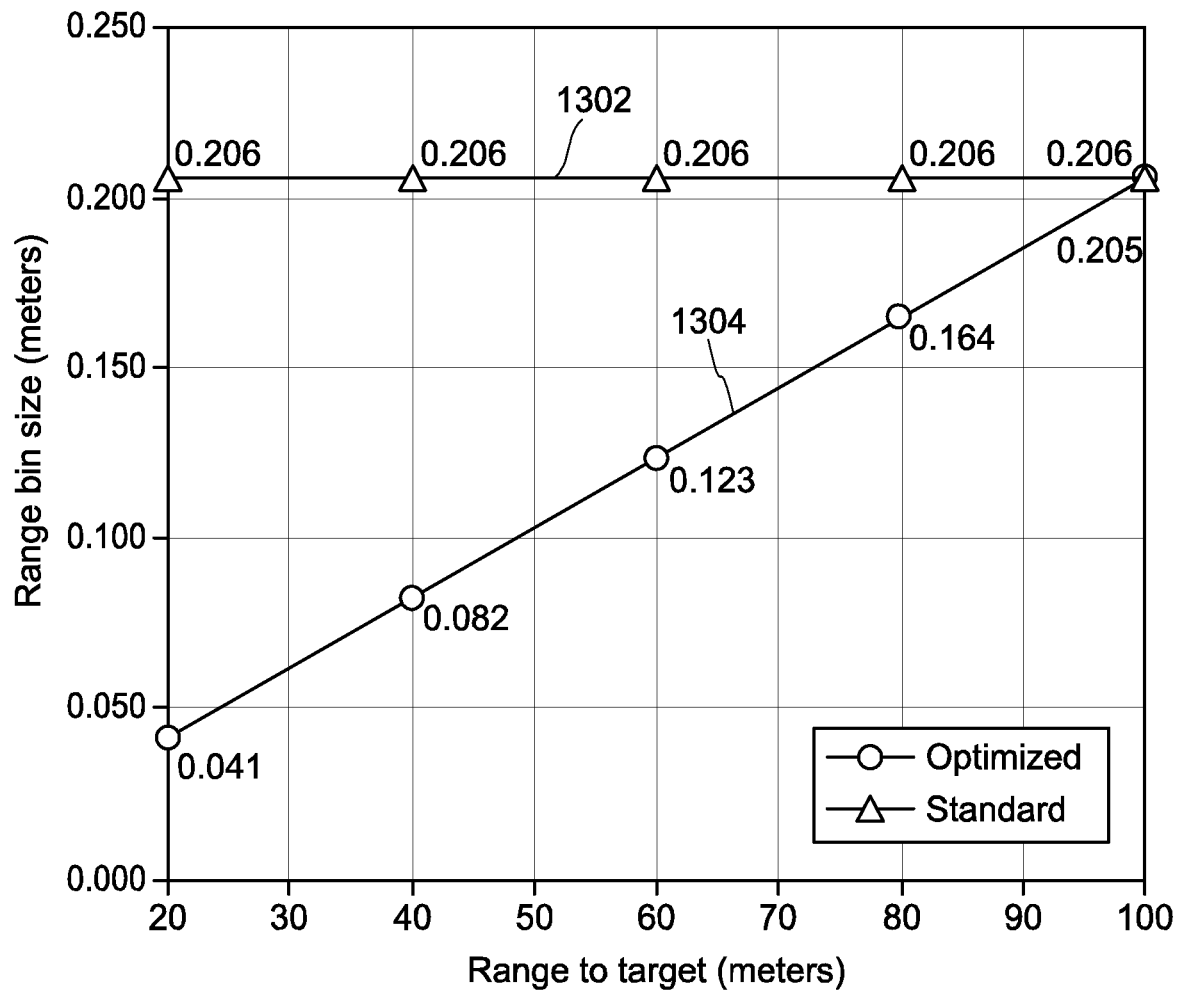
FIG. 13 shows a plot of range to target versus range bin size, in accordance with some embodiments.

FIG. 13 shows a plot of range to target versus range bin size, in accordance with some embodiments. Smaller range bin size means higher precision in localizing the target. This is extremely applicable in the scenario where a moving vehicle and a moving target, e.g. another moving vehicle, are approaching each other. As discussed, current radars do not vary the range bin size as a function of target range. Hence range bin size is not optimized in current radars. Specifically, line 1302 shows the range bin size remaining constant across the entire range to target, as measured in meters. More specifically, the range bin size for this particular radar scenario is 0.206 meters, regardless of the range to the target. By using Equation 1 the radar waveform can be designed to be optimal based on the last-detected range of the target. Line 1304 shows the results of this optimization. Using the same scenario as before, when the target is 100 meters from the radar, the range bin size is the same 0.206 meters. However, as the range decreases, the range bin size goes up, meaning that the radar is more precisely able to detect the range to the target. This is ideal for many applications, such as a spacecraft approaching a docking port, an aerial refueling aircraft that must precisely align its boom or its flight plan, detecting and tracking an object, or a drone ramming another drone. All of these scenarios can benefit from higher-precision target localization as the range to target falls.

Several components described in this paper, including clients, servers, and engines, may be compatible with or implemented using a cloud-based computing system. As used in this paper, a cloud-based computing system is a system that provides computing resources, software, and/or information to client devices by maintaining centralized services and resources that the client devices may access over a communication interface, such as a network. The cloud-based computing system may involve a subscription for services or use a utility pricing model. Users may access the protocols of the cloud-based computing system through a web browser or other container application located on their client device.

This paper describes techniques that those of skill in the art may implement in numerous ways. For instance, those of skill in the art may implement the techniques described in this paper using a process, an apparatus, a system, a composition of matter, a computer program product embodied on a computer-readable storage medium, and/or a processor, such as a processor configured to execute instructions stored on and/or provided by a memory coupled to the processor. Unless stated otherwise, a component such as a processor or a memory described as being configured to perform a task may be implemented as a general component that is configured to perform the task at a given time or a specific component that is manufactured to perform the task. As used in this paper, the term 'processor' refers to one or more devices, circuits, and/or processing cores configured to process data, such as computer program instructions.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" refers to at least one of a set and indicates that one member of the set or multiple members of the set satisfy the claim. For example, claim language reciting "at least one of A and B" means A, B, or A and B.

What is claimed is:

1. A radar system comprising:
a signal generator comprising:
a waveform optimization module operative to:
identify a plurality of operational limits defining a plurality of limits of a detection operation, imaging operation, or some combination thereof, the plurality of operational limits being associated with a plurality of operational values of operational parameters;
identify radar waveform parameters to optimize;
determine a plurality of optimal values for the radar waveform parameters based on the plurality of operational values associated with the plurality of operational limits;
a modulation generation module operative to generate a plurality of optimized radar signals using the plurality of optimal values of the radar waveform parameters, wherein the plurality of optimized radar signals are optimized for each of the plurality of operational limits; and
one or more antennas coupled to the signal generator, the one or more antennas operative to transmit the plurality of optimized radar signals toward a target in a target area.

2. The radar system of claim 1, wherein:
the plurality of operational values comprise a plurality of distances to the target area;
the plurality of optimal values for the radar waveform parameters comprise a plurality of frame rates; and
the modulation generation module is operative to increase the plurality of frame rates as the plurality of distances to the target area decrease.

3. The radar system of claim 1, further comprising a controller coupled to the signal generator, the controller operative to provide control instructions to control a vehicle based on one or more of the plurality of optimized radar signals.

4. The radar system of claim 1, wherein the plurality of operational values comprise a plurality of distances to the target area, the plurality of optimal values for the radar waveform parameters comprise a plurality of frame rates, and the modulation generation module is operative to increase the plurality of frame rates as the plurality of distances to the target area decrease, the radar system further comprising a controller coupled to the signal generator, wherein the controller is operative to provide control instructions to control a vehicle based on the plurality of optimized radar signals.

5. The radar system of claim 4, wherein the controller is operative to provide the control instructions at an increasing rate based on the increase of the plurality of frame rates by the modulation generation module.

6. A method comprising:
identifying a plurality of operational limits defining a plurality of limits of a detection operation, imaging operation, or some combination thereof, the plurality of operational limits being associated with a plurality of operational values of operational parameters;
identifying radar waveform parameters to optimize;
determining a plurality of optimal values for the radar waveform parameters based on the plurality of operational values associated with the plurality of operational limits;
generating a plurality of optimized radar signals using the plurality of optimal values of the radar waveform parameters, wherein the plurality of optimized radar signals are optimized for each of the plurality of operational limits; and
transmitting the plurality of optimized radar signals toward a target in a target area.

7. The method of claim 6, wherein the plurality of operational values comprise a plurality of distances to the target area and the plurality of optimal values for the radar waveform parameters comprise a plurality of frame rates, the method further comprising increasing the plurality of frame rates as the plurality of distances to the target area decrease.

8. The method of claim 6, further comprising providing control instructions to control a vehicle based on one or more of the plurality of optimized radar signals.

9. The method of claim 6, wherein the plurality of operational values comprise a plurality of distances to the target area, the plurality of optimal values for the radar waveform parameters comprise a plurality of frame rates, the method further comprising:
increasing the plurality of frame rates as the plurality of distances to the target area decrease; and
providing control instructions to control a vehicle based on the plurality of optimized radar signals.

10. The method of claim 9, wherein the control instructions are provided at an increasing rate based on the increase of the plurality of frame rates.

11. A method of fabricating a drive control system comprising:
configuring a signal generator for a radar system coupled to the drive control system to:
identify first operational limits defining a limit of a detection operation, imaging operation, or some combination thereof for the radar system of the drive control system, the first operational limits being associated with first operational values of operational parameters;
identify radar waveform parameters to optimize;
determine first optimal values for the radar waveform parameters based on the first operational values associated with the first operational limits;
generate a first optimized radar signal using the first optimal values of the radar waveform parameters, wherein the first optimized radar signal is optimized for the first operational limits; and
configuring the drive control system to provide control instructions to drive a host platform based on transmission of the first optimized radar signal toward one or more targets in a target area.

12. The method of claim 11, wherein the drive control system is a flight control system configured to control flight of the host platform and the host platform comprises a vehicle.

13. The method of claim 11, wherein the host platform is either a stationary host or a host platform configured for either or both bounded displacement and rotation about one or more fixed points.

14. The method of claim 13, wherein the host platform operates in supporting a ground-based surveillance system.

15. A method of fabricating a drive control system comprising:
configuring a signal generator for a radar system coupled to the drive control system to:
identify a plurality of operational limits defining a plurality of limits of a detection operation, imaging operation, or some combination thereof, the plurality of operational limits being associated with a plurality of operational values of operational parameters;
identify radar waveform parameters to optimize;
determine a plurality of optimal values for the radar waveform parameters based on the plurality of operational values associated with the plurality of operational limits;
generate a plurality of optimized radar signals using the plurality of optimal values of the radar waveform parameters, wherein the plurality of optimized radar signals are optimized for each of the plurality of operational limits; and
configuring the drive control system to provide control instructions to drive a vehicle based on transmission of the plurality of optimized radar signals toward one or more targets in a target area.

16. The method of claim 15, wherein the plurality of operational values comprise a plurality of distances to the target area and the plurality of optimal values for the radar waveform parameters comprise a plurality of frame rates, the method further comprising increasing the plurality of frame rates as the plurality of distances to the target area decrease.

17. The method of claim 15, wherein the plurality of operational values comprise a plurality of distances to the target area, the plurality of optimal values for the radar waveform parameters comprise a plurality of frame rates, the method further comprising configuring the signal generator to increase the plurality of frame rates as the plurality of distances to the target area decrease.

18. The method of claim 17, further comprising configuring the drive control system to provide the control instructions at an increasing rate based on the increase of the plurality of frame rates.

* * * * *